(12) United States Patent
Yamasaki

(10) Patent No.: US 8,345,573 B2
(45) Date of Patent: Jan. 1, 2013

(54) COMMUNICATION QUALITY ESTIMATION SYSTEM, EQUIPMENT, METHOD AND PROGRAM

(75) Inventor: Yasuhiro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 289 days.

(21) Appl. No.: 12/744,581

(22) PCT Filed: Nov. 11, 2008

(86) PCT No.: PCT/JP2008/070447
§ 371 (c)(1),
(2), (4) Date: May 25, 2010

(87) PCT Pub. No.: WO2009/069460
PCT Pub. Date: Jun. 4, 2009

(65) Prior Publication Data
US 2010/0265838 A1  Oct. 21, 2010

(30) Foreign Application Priority Data
Nov. 26, 2007  (JP) .................................. 2007-304704

(51) Int. Cl.
H04J 1/00 (2006.01)
H04L 12/28 (2006.01)

(52) U.S. Cl. ...................................................... 370/252

(58) Field of Classification Search .................. 370/252, 370/394, 400
See application file for complete search history.

(56) References Cited

U.S. PATENT DOCUMENTS

| | | | |
|---|---|---|---|
| 2004/0105437 A1* | 6/2004 | Hoffmann | 370/386 |
| 2007/0019549 A1* | 1/2007 | Okabe | 370/232 |
| 2007/0258383 A1* | 11/2007 | Wada | 370/252 |
| 2009/0109858 A1* | 4/2009 | Yamasaki et al. | 370/242 |
| 2009/0116402 A1* | 5/2009 | Yamasaki | 370/253 |
| 2009/0190481 A1* | 7/2009 | Kobayashi et al. | 370/248 |
| 2009/0213727 A1* | 8/2009 | Aoyagi et al. | 370/216 |

FOREIGN PATENT DOCUMENTS

| | | |
|---|---|---|
| JP | 2006186845 A | 7/2006 |
| JP | 2006516855 A | 7/2006 |
| JP | 20071704668 A | 7/2007 |
| WO | 2007010763 A | 1/2007 |

OTHER PUBLICATIONS

International Search Report for PCT/JP2008/070447 mailed Dec. 9, 2008.
M. Tsuru, "Latest Trend of Internet Traffic Measurement Technique—Next Generation Flow Measurement Technique", Interop Workshop, Jun. 22, 2004.
Y. Yamasaki et al., "Evaluation of UDP/RTP Stream Measurement from Sampled Packets", Technical Report of the Institute of Electronics, Information and Communication Engineers, TM2005-62, Mar. 2006.
"sFlov,, Accuracy and Billing", INMON Corp., <Internet> http://www.inmon.com/pdf/sFlowBilling.pdf, 2004.

* cited by examiner

Primary Examiner — Andrew Lee

(57) ABSTRACT

A communication quality estimation system has: a plurality of equipments performing packet transmission on a network; and a communication quality estimation equipment. The plurality of equipments includes: a first equipment; a second equipment; and a third equipment placed downstream of the first equipment and upstream of the second equipment. The communication quality estimation equipment estimates communication quality in the third equipment by comparing a number of first packets satisfying a first sampling rule out of packets transmitted by the first equipment and a number of second packets satisfying the first sampling rule out of packets transmitted by the second equipment.

16 Claims, 20 Drawing Sheets

COMMUNICATION QUALITY ESTIMATION SYSTEM, EQUIPMENT, METHOD AND PROGRAM

TECHNICAL FIELD

The present invention relates to a technique for estimating communication quality. In particular, the present invention relates to a technique for estimating communication quality based on packet sampling technique.

BACKGROUND ART

In recent years, VoIP (Voice over IP) and stream video delivery over IP network have been common with the widespread use of broadband environment such as FTTH (Fiber To The Home). In such real-time applications, network quality degradation immediately leads to degradation of user satisfaction. Therefore, demands for network quality become severe, and thus it is important to grasp the quality of flow (a sequence of relevant packets). In order to grasp the flow quality, it may be considered to obtain packets passing through an observation point on a network. By analyzing information of the obtained packets, the flow quality can be measured.

Meanwhile, high-speed networks more than 1 Gbps have been rapidly increasing with the widespread of broadband. In such high-speed networks, it is difficult to constantly measure the quality with respect to each flow. It is therefore desirable to reduce load of the method of measuring the flow quality.

In order to reduce the load of the flow quality measurement, it is effective to extract only packets satisfying a predetermined condition (rule) out of packets passing through the observation point and not to extract the other packets. In other words, it is preferable to perform sampling of packets that is hereinafter referred to as "packet sampling". The predetermined condition used for determining whether or not to sample packets is hereinafter referred to as a "sampling rule". Refer for example to Patent Document 1 (International Publication WO2007/010763), Non-Patent Document 1 (Masato TSURU, "Latest Trend of Internet Traffic Measurement Technique—Next Generation Flow Measurement Technique", June 2004, Interop Workshop.) and Non-Patent Document 2 (Yasuhiro YAMASAKI, Hideyuki SHIMONISHI and Tutomu MURASE, "Evaluation of UDP/RTP Stream Measurement from Sampled Packets", TECHNICAL REPORT OF THE INSTITUTE OF ELECTRONICS, INFORMATION AND COMMUNICATION ENGINEERS (TM2005-62), March 2006).

The above-mentioned Non-Patent Document 1 discloses a method of trajectory sampling. In the case of the trajectory sampling, packet data is collected at many observation points. Since it is substantially impossible to collect all the packet data, the packet sampling is indispensable. Here, it is suggested in the Non-Patent Document 1 that to set the same sampling rule in each observation point, namely, "consistency" of the sampling rule between the observation points is important. In this case, a packet sampled by an observation point is also sampled by other observation points. Conversely, a packet which is not sampled by an observation point is neither sampled by other observation points. The packet data collected at many observation points are aggregated in a data aggregation server. The data aggregation server refers to the aggregated packet data to trace global flows.

The above-mentioned Non-Patent Document 2 and Patent Document 1 disclose a technique for reducing load of measuring quality of UDP/RTP (Real-time Transport Protocol) session used in many real-time applications. More specifically, according to this related technique, the packet sampling is performed based on "sequence number (hereinafter may be simply referred to as "SN")" which is a kind of field of RTP header. In other words, the sampling rule is predetermined SN, and packets with the predetermined SN only are sampled. It should be noted here that the SN of a flow is the field that a transmitting terminal increases by one every time it transmits a packet. Therefore, regarding a certain flow, probability distribution of the SN is uniform and occurrence probability of each SN is substantially even. By utilizing such property of the SN, the following "statistical" method can be introduced.

FIG. 1 is a conceptual diagram for explaining the method of estimating the flow quality by using the SN according to the related technique (refer to FIG. 10 of the Patent Document 1). In FIG. 1, a flow based on UDP/RTP is shown as an example. Regarding this flow, ten packets are transmitted from a transmitting equipment towards a receiving equipment (SN=1 to 10). Moreover, four observation equipments are provided between the transmitting equipment and the receiving equipment, and each packet is transmitted to the receiving terminal through the observation equipments. Each observation equipment samples only packets satisfying a predetermined sampling rule out of passage packets. It should be noted here that the sampling rules in respective observation equipments are the same and the sampling rules are unified among the observation equipments.

In the example shown in FIG. 1, the sampling rule is uniformly "SN=even number". Therefore, each observation equipment extracts only packets whose SN is an even number out of the passage packets. Here, let us consider a case for example where five packets of SN=2, 4, 6, 8 and 10 are extracted at the upstream two observation equipments and four packets of SN=2, 4, 8 and 10 are extracted at the downstream two observation equipments. Since the same sampling rule is set in respective observation equipments, the extracted packets are supposed to be the same in kind and number between the respective observation equipments. However, in the example shown in FIG. 1, there exists a difference in the number of the extracted packets between the second observation equipment and the third observation equipment. This means that packet loss occurs at a section between the second observation equipment and the third observation equipment. In this manner, it is possible to detect whether or not packet loss, namely quality degradation occurs, by setting the uniform sampling rule in the respective observation equipments.

Furthermore, as described above, the occurrence probability of each SN is substantially even with regard to a certain flow. Therefore, in the case where the sampling rule is set to "SN=even number", it is "statistically" estimated that "the number of packets passing through an observation equipment is twice the number of packets extracted at the same observation equipment". For example, when the number of the extracted packets in an observation equipment is 5 (SN=2, 4, 6, 8 and 10), the number (expected value) of packets passing through the same observation equipment is statistically estimated to be 10. Similarly, when the number of the extracted packets in an observation equipment is 4 (SN=2, 4, 8 and 10), the number (expected value) of packets passing through the same observation equipment is statistically estimated to be 8. In this manner, it is possible to statistically presume the number of passage packets at a certain point from the number of extracted packets at the same point, by considering the occurrence probability of packets satisfying the sampling rule (refer to Non-Patent Document 2). It is also possible in the same manner to statistically presume the number of packet losses in a certain section.

The method described by using FIG. 1 may be hereinafter referred to as a "statistical estimation method". According to the statistical estimation method, it is possible, by the packet sampling based on the SN, to statistically estimate flow quality at a certain point from the result of the packet sampling at the same point. It can be said that introduction of the sampling rule and statistical method enables reduction of the load of the flow quality measurement. However, there exists statistical error in the estimated flow quality (expected value), because the statistical method is employed. An error range of the expected value with respect to an actual value is hereinafter referred to as "error rate (%)". The error rate is given by the following equation (1).

[Equation 1]

$$\text{ERROR RATE}(\%) = \left| \frac{\text{ACTUAL VALUE} - \text{EXPECTED VALUE}}{\text{ACTUAL VALUE}} \right| \leq \frac{d}{\sqrt{c}} \quad (1)$$

In the above equation (1), the parameter c is a sample count (the number of extracted packets). The parameter d is a confidence interval coefficient. In a case where confidence interval is 95%, the parameter d is 196. The above equation (1) is described in Non-Patent Document 3 (http://www.inmon.com/pdf/sFlowBilling.pdf) or the above-mentioned Non-Patent Document 2.

DISCLOSURE OF INVENTION

The inventor of the present application has recognized the following points. That is, in the case of the above-described statistical estimation method, estimation accuracy of the flow quality (expected value) may be reduced. As described above, the error rate with regard to the estimated flow quality is given by the equation (1). As is obvious from the equation (1), the error rate is dependent on inverse of the sample count c (number of the extracted packets). Therefore, if the sample count c is small, the estimation accuracy is reduced. For example, the error rate is about 1.6% when the sample count c is 15000. However, when the sample count c is 100, the error rate is increased up to about 19.6%. In this manner, if the sample count c is small, the statistical error becomes large and the estimation accuracy is deteriorated.

An object of the present invention is to propose a different method from the statistical estimation method. More specifically, an object of the present invention is to provide a technique that can improve estimation accuracy of communication quality.

In a first aspect of the present invention, a communication quality estimation system is provided. The communication quality estimation system has: a plurality of equipments performing packet transmission on a network; and a communication quality estimation equipment. The plurality of equipments includes: a first equipment; a second equipment; and a third equipment placed downstream of the first equipment and upstream of the second equipment. The communication quality estimation equipment estimates communication quality in the third equipment by comparing a number of first packets satisfying a first sampling rule out of packets transmitted by the first equipment and a number of second packets satisfying the first sampling rule out of packets transmitted by the second equipment.

In a second aspect of the present invention, a communication quality estimation equipment connected to a plurality of equipments performing packet transmission on a network is provided. The plurality of equipments includes: a first equipment; a second equipment; and a third equipment placed downstream of the first equipment and upstream of the second equipment. The communication quality estimation equipment has: a memory device and a comparison estimation unit. In the memory device, a packet count data indicating a number of first packets satisfying a first sampling rule out of packets transmitted by the first equipment and a number of second packets satisfying the first sampling rule out of packets transmitted by the second equipment is stored. The comparison estimation unit estimates communication quality in the third equipment by referring to the packet count data and comparing the number of the first packets and the number of the second packets.

In a third aspect of the present invention, a communication quality estimation method with regard to a plurality of equipments performing packet transmission on a network is provided. The plurality of equipments includes: a first equipment; a second equipment; and a third equipment placed downstream of the first equipment and upstream of the second equipment. The communication quality estimation method includes: (A) obtaining a number of first packets satisfying a first sampling rule out of packets transmitted by the first equipment and a number of second packets satisfying the first sampling rule out of packets transmitted by the second equipment; and (B) estimating communication quality in the third equipment by comparing the number of the first packets and the number of the second packets.

In a fourth aspect of the present invention, a communication quality estimation program that causes a computer to perform communication quality estimation processing with regard to a plurality of equipments performing packet transmission on a network is provided. The plurality of equipments includes: a first equipment; a second equipment; and a third equipment placed downstream of the first equipment and upstream of the second equipment. The communication quality estimation processing includes: (a) reading a packet count data indicating a number of first packets satisfying a first sampling rule out of packets transmitted by the first equipment and a number of second packets satisfying the first sampling rule out of packets transmitted by the second equipment from a memory device; and (b) estimating communication quality in the third equipment by referring to the packet count data and comparing the number of the first packets and the number of the second packets.

According to the present invention, it is possible to improve estimation accuracy of communication quality.

BRIEF DESCRIPTION OF DRAWINGS

The above and other objects, advantages and features of the present invention will be more apparent from the following description of certain exemplary embodiments taken in conjunction with the accompanying drawings.

BEST MODE FOR CARRYING OUT THE INVENTION

Exemplary embodiments of the present invention will be described with reference to the attached drawings.

1. Concept

Figure 2:
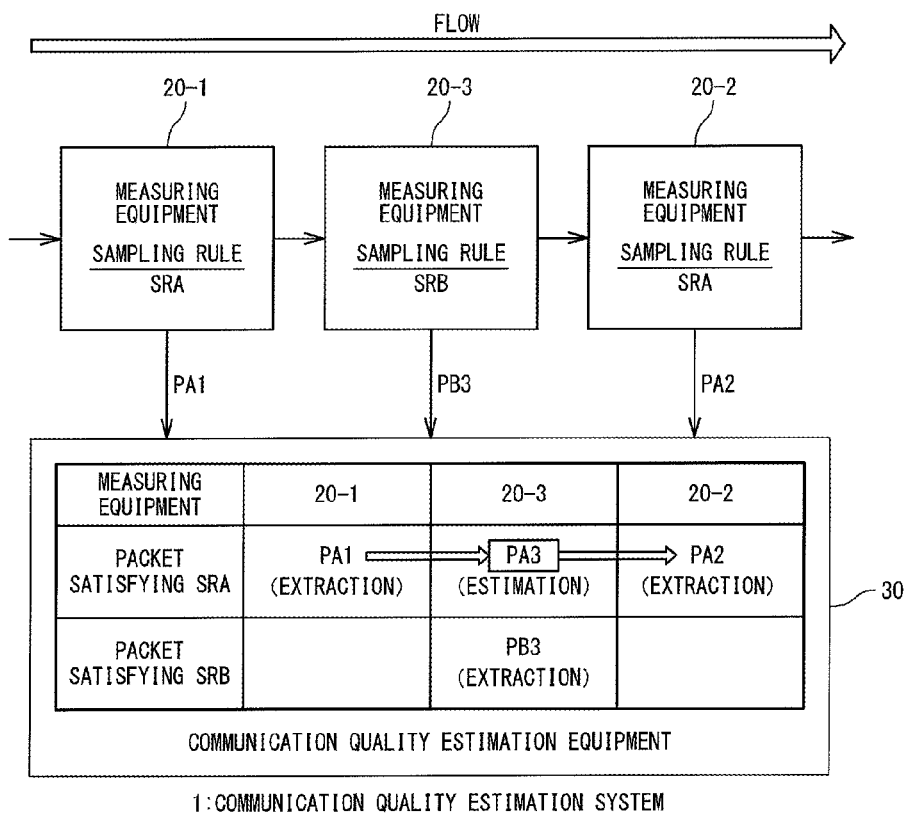
FIG. 2 is a conceptual diagram for explaining a "comparison estimation method" according to an exemplary embodiment of the present invention.

FIG. 2 is a diagram for conceptually explaining processing by a communication quality estimation system 1 according to an exemplary embodiment of the present invention. The communication quality estimation system 1 has a plurality of measuring equipments 20 and a communication quality estimation equipment 30. The respective measuring equipments 20 are provided on a network. The communication quality estimation equipment 30 is connected to the measuring equipments 20.

Each measuring equipment 20 has a function of performing packet transmission, and flow is transmitted from a transmitting equipment to a receiving equipment through the plurality of measuring equipments 20. For example, as shown in FIG. 2, the plurality of measuring equipments 20 includes a first measuring equipment 20-1, a second measuring equipment 20-2 and a third measuring equipment 20-3. The third measuring equipment 20-3 is placed between the first measuring equipment 20-1 and the second measuring equipment 20-2. In other words, the third measuring equipment 20-3 is placed downstream of the first measuring equipment 20-1 and upstream of the second measuring equipment 20-2. The flow is transmitted through in an order of the first measuring equipment 20-1, the third measuring equipment 20-3 and the second measuring equipment 20-2.

Moreover, each measuring equipment 20 has a function of performing packet sampling in accordance with a sampling rule that is set. That is, each measuring equipment 20 samples (extracts) only packets satisfying the sampling rule out of packets that it receives and transmits. Data of the extracted packet is sent to the communication quality estimation equipment 30.

Regarding the first measuring equipment 20-1 and the second measuring equipment 20-2, the same first sampling rule SRA is set. Therefore, the first measuring equipment 20-1 extracts "first packets PA1" satisfying the first sampling rule SRA from transmission packets. Also, the second measuring equipment 20-2 extracts "second packets PA2" satisfying the first sampling rule SRA from transmission packets. Since the sampling rule is the same, a packet extracted by the first measuring equipment 20-1 is supposed to be extracted also by the second measuring equipment 20-2. On the other hand, a packet that is not extracted by the first measuring equipment 20-1 is neither extracted by the second measuring equipment 20-2. That is, the first packets PA1 and the second packets PA2 become the same in kind and number, unless packet loss occurs.

Whereas, regarding the third measuring equipment 20-3, the above-mentioned first sampling rule SRA needs not be set. In the example shown in FIG. 2, the first sampling rule SRA is not set but a second sampling rule SRB different from the first sampling rule SRA is set for the third measuring equipment 20-3. Therefore, the third measuring equipment 20-3 extracts "third packets PB3" satisfying the second sampling rule SRB from transmission packets. However, the third measuring equipment 20-3 does not extract packets (hereinafter referred to as "fourth packets PA3", for convenience) satisfying the first sampling rule SRA.

Data of packets extracted by each measuring equipment 20 is sent to the communication quality estimation equipment 30. Therefore, the communication quality estimation equipment 30 can calculate a number of the first packets PA1 extracted in the first measuring equipment 20-1 and a number of the second packets PA2 extracted in the second measuring equipment 20-2. At this time, the communication quality estimation equipment 30 cannot directly calculate a number of the fourth packets PA3 satisfying the above-mentioned first sampling rule SRA in the third measuring equipment 20-3. However, the communication quality estimation equipment 30 can "estimate" a number of the fourth packets PA3 based on the number of the first packets PA1 and the number of the second packets PA2, as described below.

As described above, a flow is transmitted through in the order of the first measuring equipment 20-1, the third measuring equipment 20-3 and the second measuring equipment 20-2. In a case where no packet loss occurs, a number of passage packets passing through each measuring equipment is the same. On the other hand, in a case where packet loss occurs, the passage packet count monotonically decreases and a packet loss count monotonically increases from the upstream towards the downstream. Therefore, the respective numbers of the first packets PA1, the fourth packets PA3 and the second packets PA2 satisfying the first sampling rule SRA satisfy the following relational expression (2):

$$\text{the number of } PA1 \geq \text{the number of } PA3 \geq \text{the number of } PA2 \qquad (2)$$

As indicated by this relational expression (2), the number of the first packets PA1 and the number of the second packets PA2 respectively give an upper limit and a lower limit of the fourth packets PA3. The numbers of the first packets PA1 and the second packets PA2 are fixed by the direct measurement. Therefore, the number of the fourth packets PA3 is fixed to be not more than the number of the first packets PA1 and not less than the number of the second packets PA2. If the number of the first packets PA1 and the number of the second packets PA2 are the same, the number of the fourth packets PA3 is uniquely determined. Otherwise, the number of the fourth packets PA3 is not more than the number of the first packets PA1 and not less than the number of the second packets PA2. In this manner, it is possible to estimate the number of the fourth packets PA3 by comparing results of the direct measurement in the upstream and the downstream of the third measuring equipment 20-3, even if the fourth packets PA3 are not measured directly at the third measuring equipment 20-3.

The communication quality estimation equipment 30 estimates the number of the fourth packets PA3 by the above-described method. That is, the communication quality estimation equipment 30 estimates the number of the fourth packets PA3 by comparing the number of the first packets PA1 and the number of the second packets PA2. The number of the fourth packets PA3 is indicative of the communication quality in the third measuring equipment 20-3. That is to say, the communication quality estimation equipment 30 can estimate the communication quality in the third measuring equipment 20-3 by comparing the number of the first packets PA1 and the number of the second packets PA2.

Compared with the "statistical estimation method" shown in FIG. 1, the method shown in FIG. 2 is hereinafter referred to as a "comparison estimation method". According to the statistical estimation method, the communication quality in a certain measuring point is statistically estimated from a result of actual packet sampling at the same measuring point by considering the occurrence probability of packets satisfying the sampling rule. On the other hand, according to the comparison estimation method, the communication quality in a certain measuring point is estimated from results of actual packet sampling at the upstream and the downstream of the measuring point. In the case of the comparison estimation method, there is no need to introduce the statistical method.

Effects obtained by the comparison estimation method are as follows.

First, load on the processing of estimating the communication quality is reduced. The reason is that it is not necessarily required to perform the packet sampling at all the measuring equipments 20. In the example shown in FIG. 2, the packet sampling by the use of the first sampling rule SRA by the third measuring equipment 20-3 is not necessary. Even in this case, the communication quality in the third measuring equipment 20-3 can be estimated based on results of the packet sampling in the first measuring equipment 20-1 and the second measuring equipment 20-2. To generalize, the actual packet sampling just needs to be performed only at a part of the plurality of measuring equipments 20. As to a target measuring equipment between the measuring equipments 20 in which the packet sampling is performed, the communication quality can be estimated by the comparison estimation method. Since the amount of the packet sampling can be reduced, the processing load is reduced.

Moreover, estimation accuracy of the communication quality is improved. The reason is that no statistical method is introduced. In the case of the statistical estimation method, there exists a statistical error in the estimated communication quality (expected value), because the statistical method is used. As represented by the above equation (1), the error rate is dependent on inverse of the sample count c, and hence the estimation accuracy is deteriorated if the sample count c is small. Furthermore, since the confidence interval is not 100%, an actual value may exist outside of the error range. In the case of the comparison estimation method, on the other hand, error of the estimated communication quality does not depend on the sample count c. In the case of the example shown in FIG. 2, an error range of the number of the fourth packets PA3 is between the number of the first packets PA1 (upper limit) and the number of the second packets PA2 (lower limit), as indicated by the above-mentioned relational expression (2). Since the upper limit and the lower limit are obtained based on the direct measurement, the error range does not depend on the sample count but is fixed. The actual value certainly exists within the error range. In this manner, according to the comparison estimation method, the estimation accuracy of the communication quality is improved.

It should be noted that it is also effective to set the second sampling rule SRB in the third measuring equipment 20-3 as shown in FIG. 2, when the first sampling rule SRA matches only a part of packets of a certain flow. In this case, the third packets PB3 satisfying the second sampling rule SRB are actually extracted in the third measuring equipment 20-3. The communication quality estimation equipment 30 can estimate the communication quality of the flow in the third measuring equipment 20-3 by combining the number of the extracted third packets PB3 and the above-mentioned number of the fourth packets PB estimated in accordance with the comparison estimation method. In this manner, it is also possible to further improve the estimation accuracy of the communication quality by complementarily using the second sampling rule SRB different from the first sampling rule SRA.

Various exemplary embodiments and various processing examples are described below.

2. First Exemplary Embodiment 2-1. Configuration

Figure 3:
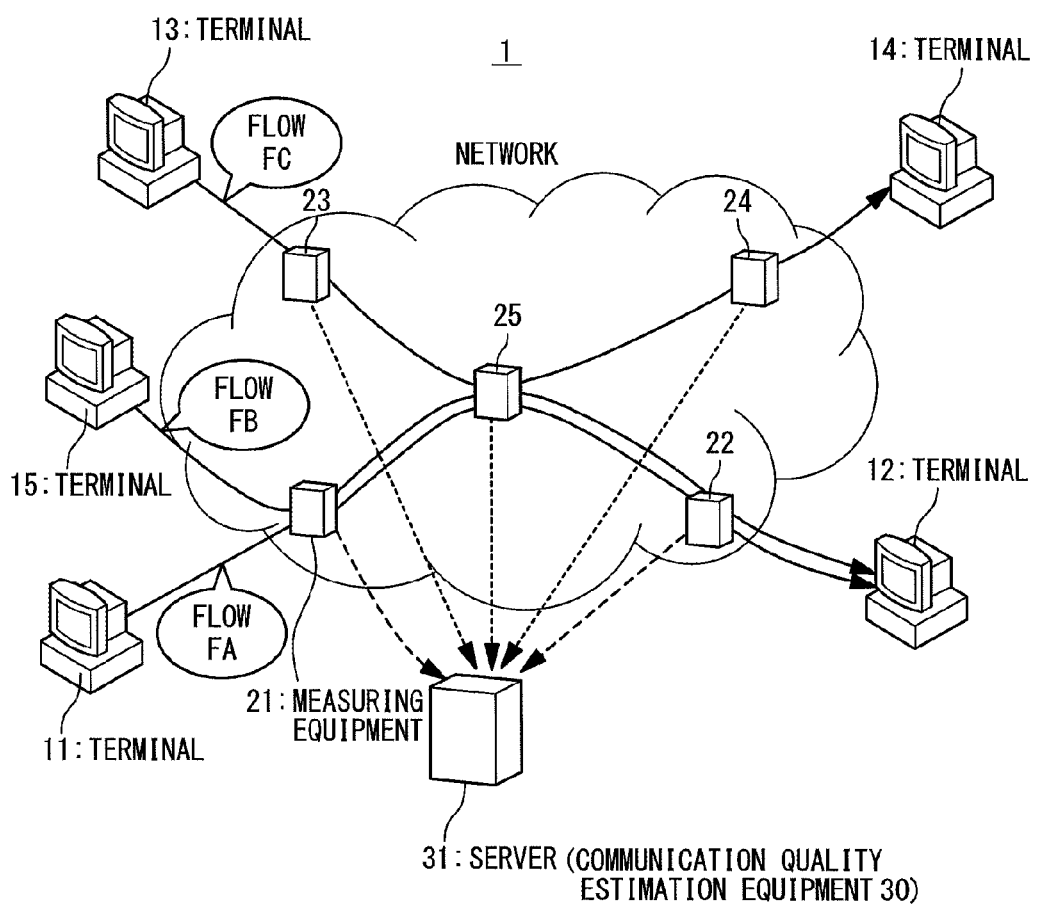
FIG. 3 is a diagram showing an example of an overall configuration of a communication quality estimation system according to the exemplary embodiment of the present invention.

FIG. 3 schematically shows an example of an overall configuration of the communication quality estimation system 1. In FIG. 3, the communication quality estimation system 1 has a plurality of transmission equipments performing packet transmission on a network and the communication quality estimation equipment 30. The plurality of transmission equipments includes terminals 11 to 15 and measuring equipments 21 to 25 that are placed on the network. In the present exemplary embodiment, the communication quality estimation equipment 30 is a server 31 connected to each transmission equipment through the network. The network shown in FIG. 3 is in a state where communication of three flows FA, FB and FC is performed.

Figure 4:
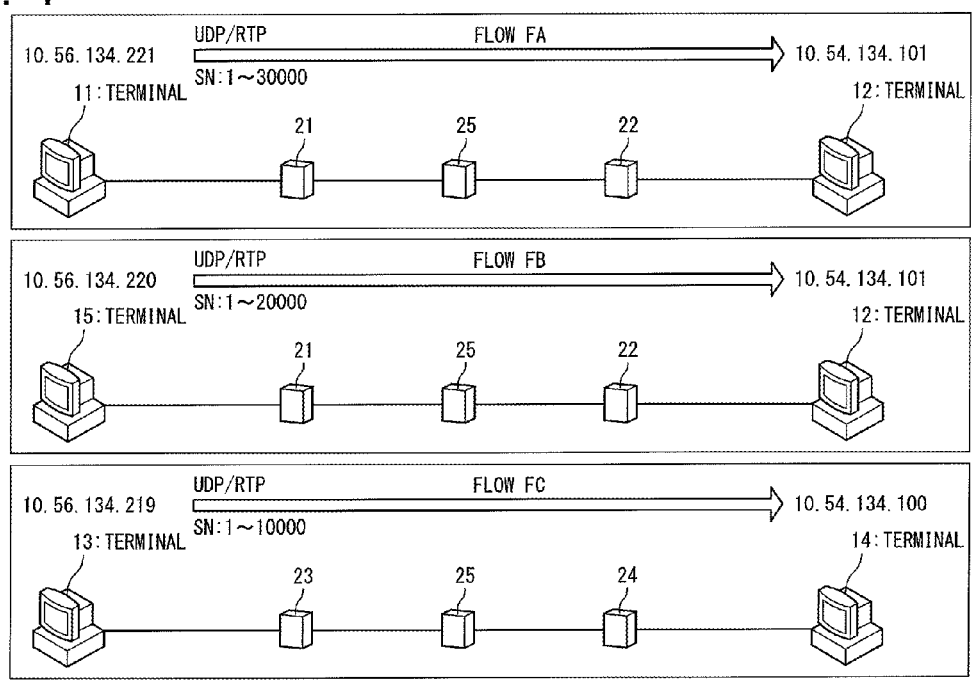
FIG. 4 is a conceptual diagram showing paths of respective flows.

FIG. 4 is a conceptual diagram showing paths of respective flows FA, FB and FC. Each flow is communicated based on the UDP/RTP. More specifically, in the case of the flow FA, 30000 packets whose RTP sequence numbers (SN) are 1 to 30000 are transmitted from the terminal 11 (IP address: 10.56.134.221) as a transmitting equipment towards the terminal 12 (IP address: 10.54.134.101) as a receiving equipment. The flow FA is transmitted from the terminal 11 through the measuring equipments 21, 25 and 22 in this order to the terminal 12. In the case of the flow FB, 20000 packets (SN: 1 to 20000) are transmitted from the terminal 15 (IP address: 10.56.134.220) as a transmitting equipment towards the terminal 12 (IP address: 10.54.134.101) as a receiving equipment. The flow FB is transmitted from the terminal 15 through the measuring equipments 21, 25 and 22 in this order to the terminal 12. In the case of the flow FC, 10000 packets (SN: 1 to 10000) are transmitted from the terminal 13 (IP address: 10.56.134.219) as a transmitting equipment towards the terminal 14 (IP address: 10.54.134.100) as a receiving equipment. The flow FC is transmitted from the terminal 13 through the measuring equipments 23, 25 and 24 in this order to the terminal 14.

Figure 5:
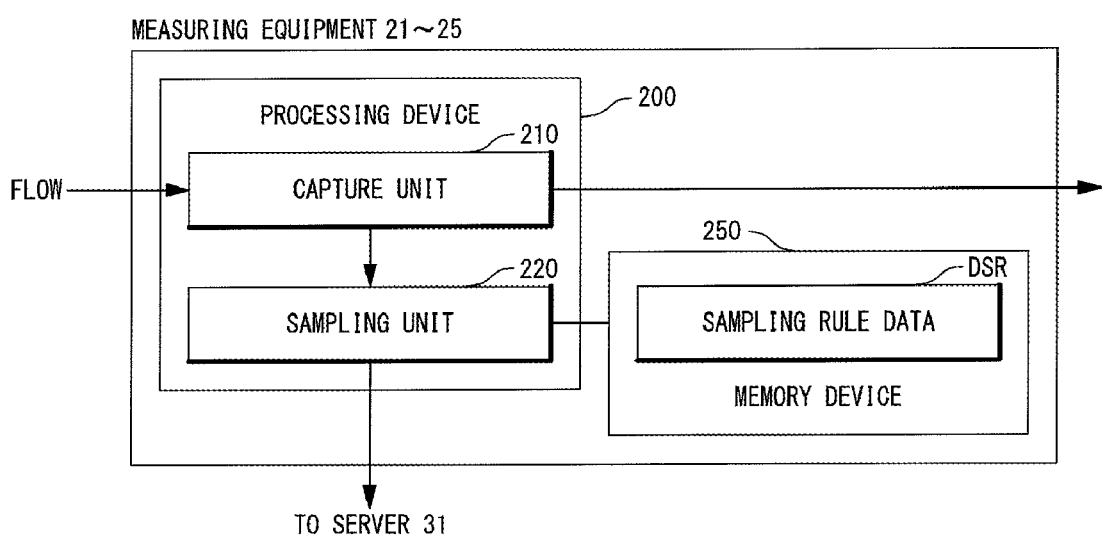
FIG. 5 is a block diagram showing a configuration example of each measuring equipment in the exemplary embodiment of the present invention.

FIG. 5 is a block diagram showing a configuration example of each measuring equipment (21 to 25). Each measuring equipment is for example a router and has a packet transmission function. Moreover, each measuring equipment has a function of performing the packet sampling in accordance with the sampling rule that is set. More specifically, each measuring equipment has a processing device 200 and a memory device 250. The processing device 200 has a capture unit 210 performing packet reception/transmission and a sampling unit 220 performing the packet sampling. A sampling rule data DSR indicating the set sampling rule is stored in the memory device 250.

The sampling rule gives a condition used for determining whether or not to sample a packet. In the present exemplary embodiment, the sampling rule gives a condition of a predetermined field in the RTP packet. The predetermined field is whole of or a part of fields (for example, source and destination IP addresses, sequence number, port number, protocol ID and the like) other than fields that change during communication (for example, TTL field and checksum field of IP header). It should be noted in the present exemplary embodiment that the sampling rules set in the respective measuring equipments 21 to 25 are not necessarily the same.

Figure 6:
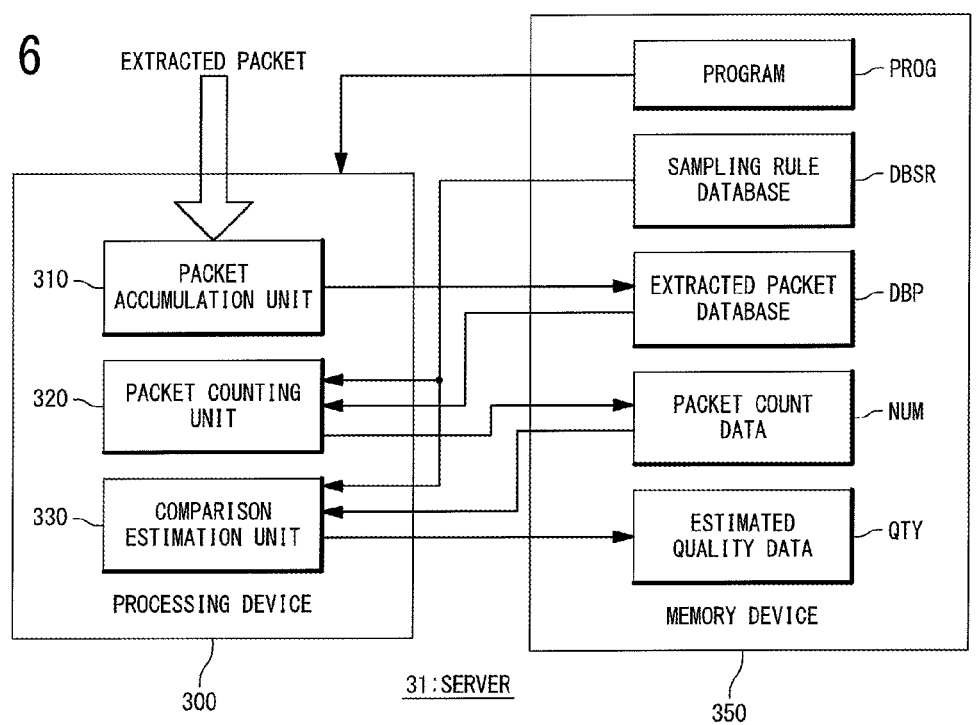
FIG. 6 is a block diagram showing a configuration of a communication quality estimation equipment according to a first exemplary embodiment of the present invention.

FIG. 6 is a block diagram showing a configuration example of the server 31 as the communication quality estimation equipment 30 according to the present exemplary embodiment. The server 31 has a processing device 300 and a memory device 350. The processing device 300 includes a CPU and executes various data processing. The memory device 350 is exemplified by a RAM and an HDD.

A sampling rule database DBSR, an extracted packet database DBP, a packet count data NUM, an estimated quality data QTY and the like are stored in the memory device 350. The sampling rule database DBSR indicate the sampling rules applied to the respective measuring equipments 21 to 25. For example, a correspondence relationship between an ID number of each measuring equipment and the sampling rule that is set is indicated. The extracted packet database DBP, the packet count data NUM and the estimated quality data QTY are data generated in communication quality estimation processing described later.

Moreover, a program PROG for the communication quality estimation processing is stored in the memory device 350. The program PROG is software executed by the processing device 300. Typically, the program PROG is recorded on a computer-readable recording medium and read by the processing device 300. The processing device 300 executes the program PROG to achieve the communication quality estimation processing described later. More specifically, as shown in FIG. 6, the processing device 300 has a packet accumulation unit 310, a packet counting unit 320 and a comparison estimation unit 330. The packet accumulation unit 310, packet counting unit 320 and comparison estimation unit 330 are achieved by the processing device 300 executing the program PROG.

2-2. Operation

Figure 7:
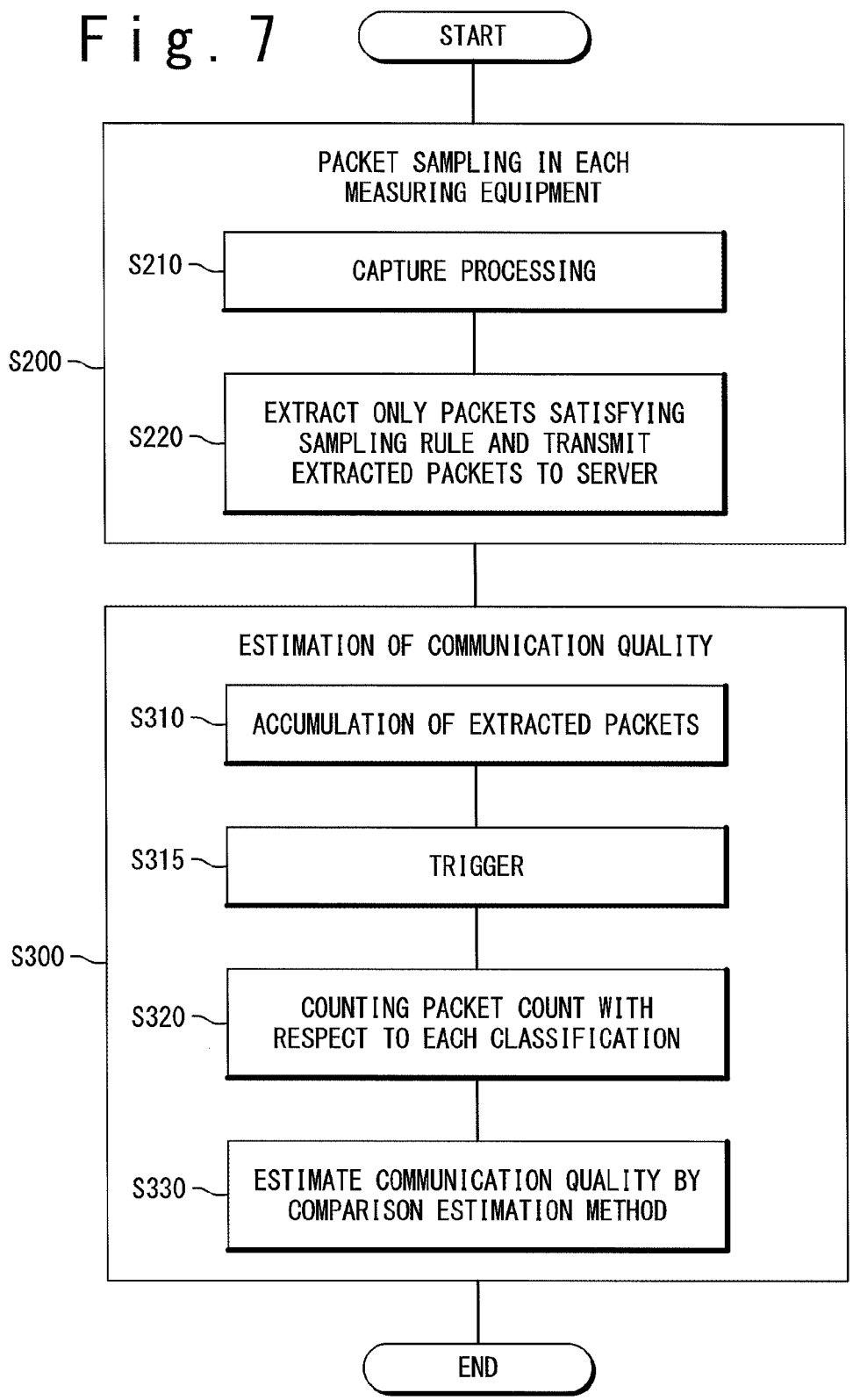
FIG. 7 is a flow chart showing a communication quality estimation method in the first exemplary embodiment.

FIG. 7 is a flow chart showing a communication quality estimation method in the present exemplary embodiment. The communication quality estimation processing will be described with reference to FIG. 7 and the foregoing FIG. 5 and FIG. 6. When a packet passes through the measuring equipments 21 to 25 in the network, the processing is started.

(Step S200)

In Step S200, each of the measuring equipments 21 to 25 performs the packet sampling.

(Step S210)

More specifically, when a packet is input to a measuring equipment, the capture unit 210 takes in the input packet. The capture unit 210 performs packet forwarding processing to transmit the packet to the network. In addition to that, the capture unit 210 transfers data of the packet to the sampling unit 220. The packet data is exemplified by the packet itself. Alternatively, the packet data may be a part of a packet header or a numerical value obtained by applying hash processing to the packet header.

(Step S220)

The sampling unit 220 receives the packet data from the capture unit 210. Then, the sampling unit 220 refers to the sampling rule indicated by the sampling rule data DSR and determines whether or not the packet is the sampling target. In a case where the predetermined field included in the packet data satisfies the sampling rule, the packet is the sampling target. In the other cases, the packet is not the sampling target. The sampling unit 220 adds an ID number of the measuring equipment to the packet data of the sampling target and transfers it to the server 31.

In this manner, in Step S200, each measuring equipment samples (extracts) only packets satisfying the sampling rule from the packets it transmits. Data of the extracted packet is transferred along with the ID number of the measuring equipment to the server 31. The transfer timing is, for example, for each packet, at regular interval, or every time the number of the extracted packets becomes a certain number.

(Step S300)

In Step S300, the server 31 performs communication quality estimation processing.

(Step S310)

When the server 31 receives the data transmitted from each of the measuring equipments 21 to 25, the packet accumulation unit 310 organizes the received data and accumulates it in the memory device 350 as needed. More specifically, the packet accumulation unit 310 stores the data of the extracted packet received from each of the measuring equipments 21 to 25 in the extracted packet database DBP in the memory device 350. The data stored at this time includes at least a part of the packet data and the ID number of the measuring equipment. For example, an ID number of the flow to which the extracted packet belongs and the ID number of the measuring equipment are stored in the extracted packet database DBP.

(Step S315)

The communication quality estimation processing is executed with respect to each unit. For example, the processing is executed when communication of a certain flow is ended. Alternatively, the processing may be executed at regular interval. Alternatively, the processing may be executed when a specific packet (e.g. SYN, FIN of TCP, a packet having a specific sequence number, and the like) arrives. When the start timing of the estimation processing comes, the next Step S320 is executed.

(Step S320)

The packet counting unit 320 carries out searches over the above-mentioned extracted packet database DBP and counts the number of the extracted packets with respect to each classification. For example, the classification includes the ID number of the measuring equipment (hereinafter referred to as an "equipment number") and the ID number of the flow (hereinafter referred to as a "flow number"). In this case, the packet counting unit 320 classifies the extracted packets with respect to each combination of the equipment number and the flow number, and counts the number of the extracted packets with respect to each classification. A data indicating the counting result is the packet count data NUM. The packet count data NUM is, for example, a table indicating the equipment number, the flow number and the extracted packet count. In addition, other information such as a packet loss count, packet extraction time and the sampling rule may be indicated. In this manner, the packet counting unit 320 generates the packet count data NUM with reference to the extracted packet database DBP. The generated packet count data NUM is stored in the memory device 350.

(Step S330)

Next, the comparison estimation unit 330 reads the packet count data NUM from the memory device 350. The packet count data NUM indicates the numbers of the extracted packets that are extracted in accordance with the sampling rule in the respective measuring equipments 21 to 25. Therefore, the comparison estimation unit 330 can estimate the communication quality by the "comparison estimation method" described in the foregoing first section. A data indicating the estimated communication quality is the estimated quality data QTY. The comparison estimation unit 330 generates the estimated quality data QTY and stores it in the memory device 350.

For example, let us consider a case where communication quality of a certain flow is estimated. In this case, the comparison estimation unit 330 refers to the equipment number and flow number in the packet count data NUM to recognize which measuring equipments the flow goes through. Next, the comparison estimation unit 330 refers to the sampling rule database DBSR to check the sampling rules applied to the respective measuring equipments through which the flow goes. If there exists measuring equipments to which the same sampling rule is applied, communication quality of another measuring equipment placed between those measuring equipments can be estimated by the comparison estimation method. Therefore, the comparison estimation unit 330 searches the packet count data NUM by using the corresponding equipment number and the flow number and obtains the numbers of the extracted packets extracted in the respective measuring equipments to which the same sampling rule is applied. Then, the comparison estimation unit 330 uses the respective packet counts obtained to estimate the communication quality based on the comparison estimation method.

2-3. Processing Example (1)

Figure 8:
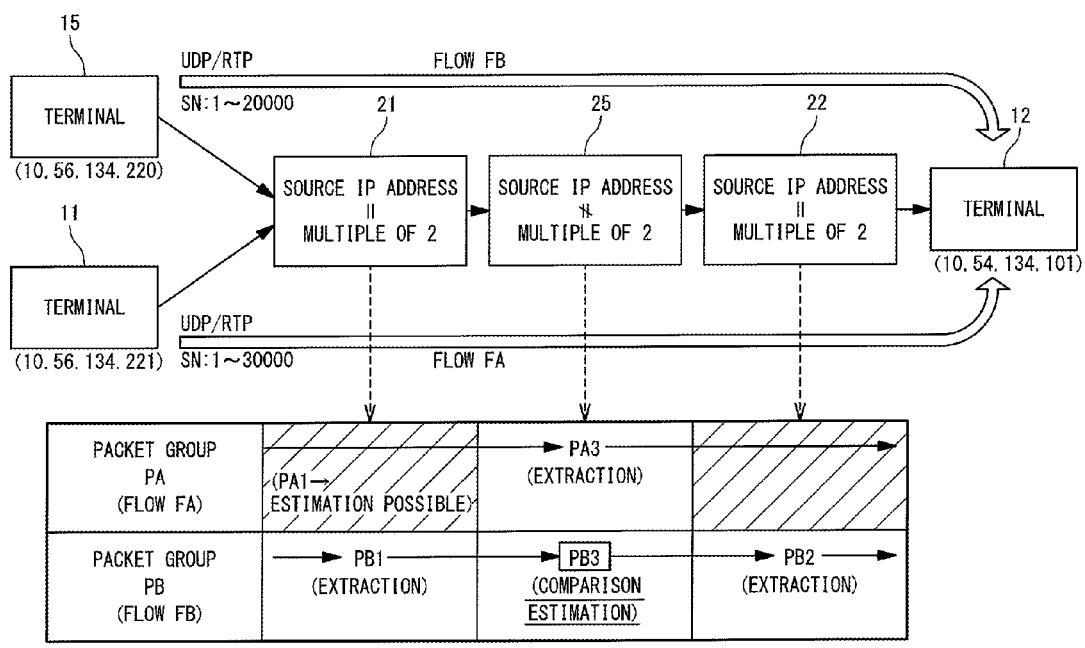
FIG. 8 is a diagram for explaining a first processing example.

Next, a concrete example of the processing will be described with reference to FIGS. 8 and 9. In FIG. 8, flow FA is communicated from the terminal 11 (IP address: 10.56.134.221) to the terminal 12 (IP address: 10.54.134.101). A total number of packets of the flow FA is 30000 (SN: 1 to 30000). Also, flow FB is communicated from the terminal 15 (IP address: 10.56.134.220) to the terminal 12 (IP address: 10.54.134.101). A total number of packets of the flow FB is 20000 (SN: 1 to 20000). The flows FA and FB both pass through the measuring equipments 21, 25 and 22. The measuring equipment 25 (third equipment) is placed downstream of the measuring equipment 21 (first equipment) and upstream of the measuring equipment 22 (second equipment).

In the present example, the sampling rule relates to the "source IP address" in the RTP packet. The first sampling rule SRA applied to the measuring equipment 21 and the measuring equipment 22 is the same one, that is "source IP address=multiple of 2". On the other hand, the second sampling rule SRB applied to the measuring equipment 25 is different from the first sampling rule SRA, that is "source IP address≠multiple of 2".

In this case, the measuring equipment 21 extracts packets whose last of the source IP address is divisible by 2, namely, packets PB1 (first packet) of the flow FB from the terminal 15. Also, the measuring equipment 22 extracts packets whose last of the source IP address is divisible by 2, namely, packets PB2 (second packet) of the flow FB from the terminal 15. Meanwhile, the measuring equipment 25 does not extract packets PB3 (fourth packet) of the flow FB. Instead, the measuring equipment 25 extracts packets whose last of the source IP address is not divisible by 2, namely, packets PA3 (third packet) of the flow FA from the terminal 11.

Figure 9:
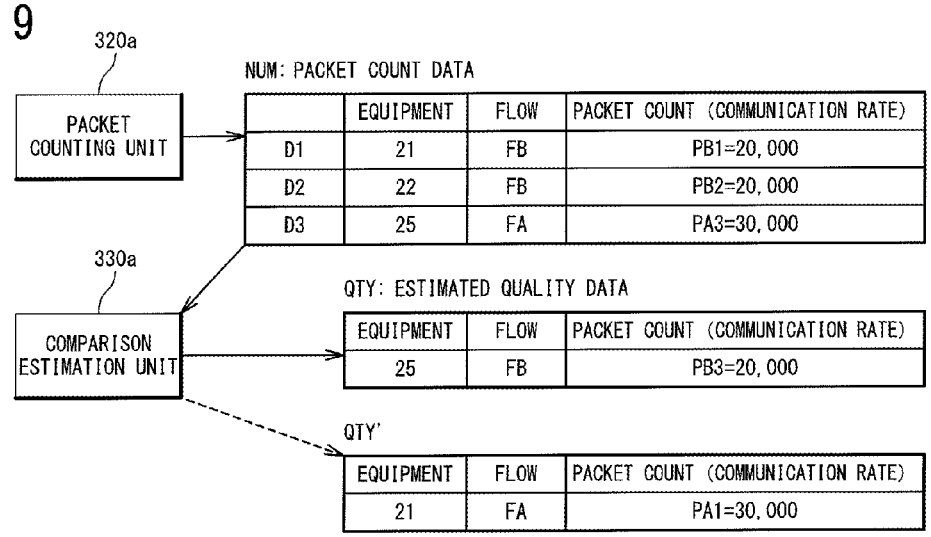
FIG. 9 is a diagram for explaining the first processing example.

As shown in FIG. 9, the packet counting unit 320a counts the number of the extracted packets with respect to each classification. In the present example, the classification is a combination of the equipment number and the flow number. Therefore, the packet counting unit 320a counts respective numbers of the extracted packets PB1, PB2 and PA3 to generate the packet count data NUM. In FIG. 9, the packet count data NUM includes entries D1 to D3, and each entry indicates correspondence relationship between the equipment number, the flow number and the packet count (communication rate). For example, the number of the packets PB1 extracted by the measuring equipment 21 is 20000, the number of the packets PB2 extracted by the measuring equipment 22 is 20000, and the number of the packets PA3 extracted by the measuring equipment 25 is 30000.

The comparison estimation unit 330a refers to the packet count data NUM to estimate the communication quality by the comparison estimation method. First, it can be seen from the packet count data NUM that the flow FB has passed through the measuring equipment 21 and the measuring equipment 22. Next, the comparison estimation unit 330a refers to the sampling rule database DBSR to check the sampling rules applied to the respective measuring equipments 21 and 22. In the present example, the respective sampling rules are the same "source IP address=multiple of 2". It is therefore possible to apply the comparison estimation method with respect to the measuring equipment 25 placed between the measuring equipments 21 and 22. The comparison estimation unit 330a refers to the packet count data NUM again to obtain the number of the packets PB1 extracted by the measuring equipment 21 (=20000) and the number of the packets PB2 extracted by the measuring equipment 22 (=20000). By a comparison between the two numbers, the number of the packets PB3 of the flow FB that has passed through the measuring equipment 25 is estimated to be "20000". The estimated quality data QTY shown in FIG. 9 indicates the estimation result.

In this manner, the number of the packets PB3 (communication rate) can be estimated based on the sampling results in the upstream and downstream, although the packets PB3 of the flow FB are not extracted directly in the measuring equipment 25. The processing load is reduced, because it is not necessary to extract the flow FB in the measuring equipment 25. Even if the direct measurement is not performed, it is possible to estimate the quality (communication rate) of the flow FB in the measuring equipment 25 with a high degree of accuracy.

Furthermore, in the present example, the quality of the flow FA in the measuring equipment 21 can also be estimated as follows. With regard to the flow FA from the terminal 11, as shown in FIG. 8, the packets PA3 are extracted in the measuring equipment 25 while the packets PA1 (source IP address≠multiple of 2) are not extracted in the measuring equipment 21. Here, the number of packets transmitted from the terminal 11 (transmitting equipment) as the source of the flow FA may be known by considering implicit prerequisite of the protocol. In this case, the communication rate of the flow FA in the measuring equipment 21 (third equipment) placed between the terminal 11 (first equipment) and the measuring equipment 25 (second equipment) can be estimated by the comparison estimation method.

For example, in the case shown in FIGS. 8 and 9, by referring to the sequence number (SN) of the packet PA3 extracted by the measuring equipment 25, it is revealed that "packets whose SN are 1 to 30000 have passed through the measuring equipment 25". This means that "30000 packets have been transmitted from the transmitting equipment", in consideration of the protocol being UDP/RTP. Therefore, when counting the number of the packets PA3, the packet counting unit 320a refers to the SN to be able to estimate that the number of packets transmitted from the transmitting equipment is 30000. Then, this information also is added to the packet count data NUM. The processing thereafter is the same. Based on the number of packets transmitted from the transmitting equipment (=30000) and the number of the packets PA3 (=30000), the comparison estimation unit 330a estimates the number of the packets PA1 of the flow FA having passed through the measuring equipment 21 to be "30000". The estimated quality data QTY' shown in FIG. 9 indicates the estimation result.

As described above, two measuring equipments are not necessarily utilized in the comparison estimation method. The comparison estimation method can be carried out, for example, by utilizing one transmitting equipment and one measuring equipment. An equipment other than the transmitting equipment can also be utilized as an alternative to the measuring equipment. For example, in a case where a relaying equipment supplementing the quality is provided in the network, the number of packets transmitted from the relaying equipment can be guessed from a group of extracted packets in the downstream measuring equipment. Therefore, it is also possible to carry out the comparison estimation method by utilizing one relaying equipment and one measuring equipment. To generalize, when communication quality in a certain equipment in the network can be guessed by some kind of means, the comparison estimation method can be carried out by utilizing the certain equipment and the measuring equipment.

It should be noted that the target field of the sampling rule is the "source IP address" in the above description, but it is not limited to that. The target field when the comparison estimation method is used just needs to satisfy the following condition (A).

"Condition (A): whole of or a part of fields other than fields that change during communication".

For example, the fields that change during communication include the TTL field of IP header and the checksum field. Note that, the condition (A) just needs to be satisfied within the network region where the measuring equipments are placed. Therefore, if a plurality of measuring equipments are placed within the same LAN, such fields as the TTL field and the MAC address also satisfy the condition (A).

2-4. Processing Example (2)

Figure 10:
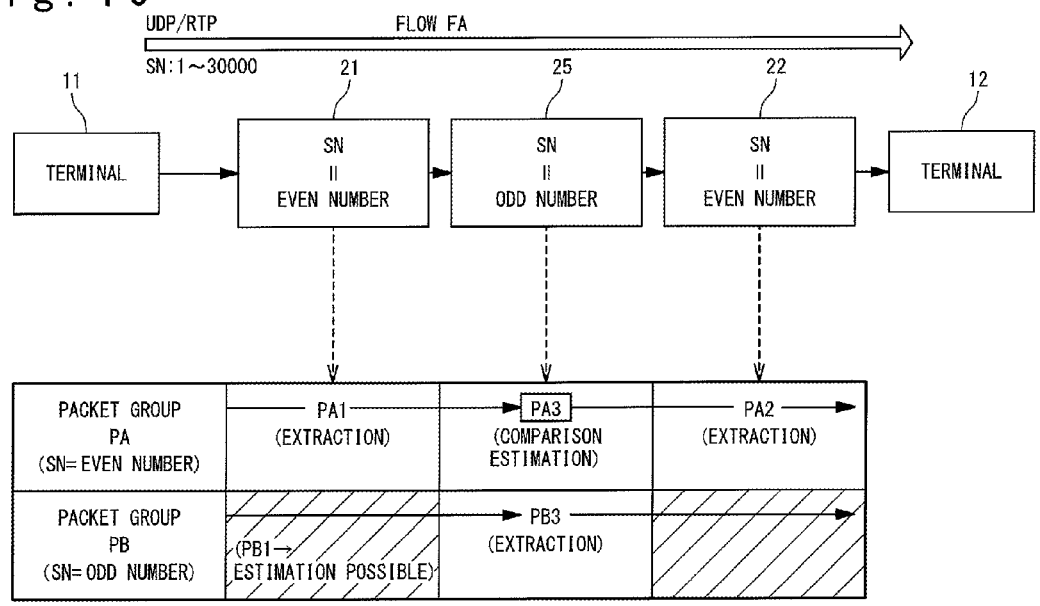
FIG. 10 is a diagram for explaining a second processing example.

Next, another concrete example of the processing will be described with reference to FIGS. 10 and 11. As shown in FIG. 10, flow FA is communicated from the terminal 11 to the terminal 12 through the measuring equipments 21, 25 and 22. A total number of packets of the flow FA is 30000 (SN: 1 to 30000). In the present example, "communication rate" and "packet loss rate" with regard to the flow FA in a measuring equipment are estimated by the comparison estimation method.

In the present example, the sampling rule relates to the "RTP sequence number (SN)" in the RTP packet. The SN of the flow FA is the field that the terminal 11 increases by one every time it transmits a packet. As shown in FIG. 10, the first sampling rule SRA applied to the measuring equipment 21 and the measuring equipment 22 is the same one, that is "SN=even number". On the other hand, the second sampling rule SRB applied to the measuring equipment 25 is different from the first sampling rule SRA, that is "SN=odd number". It can be said that the first sampling rule SRA and the second sampling rule SRB are orthogonal to each other.

In this case, the measuring equipment 21 extracts packets PA1 (first packet) whose SN is an even number out of the packets of the flow FA. Also, the measuring equipment 22 extracts packets PA2 (second packet) whose SN is even number out of the packets of the flow FA. Meanwhile, the measuring equipment 25 does not extract packets PA3 (fourth packet) whose SN is an even number out of the packets of the flow FA. Instead, the measuring equipment 25 extracts packets PB3 (third packet) whose SN is an odd number out of the packets of the same flow FA.

Figure 11:
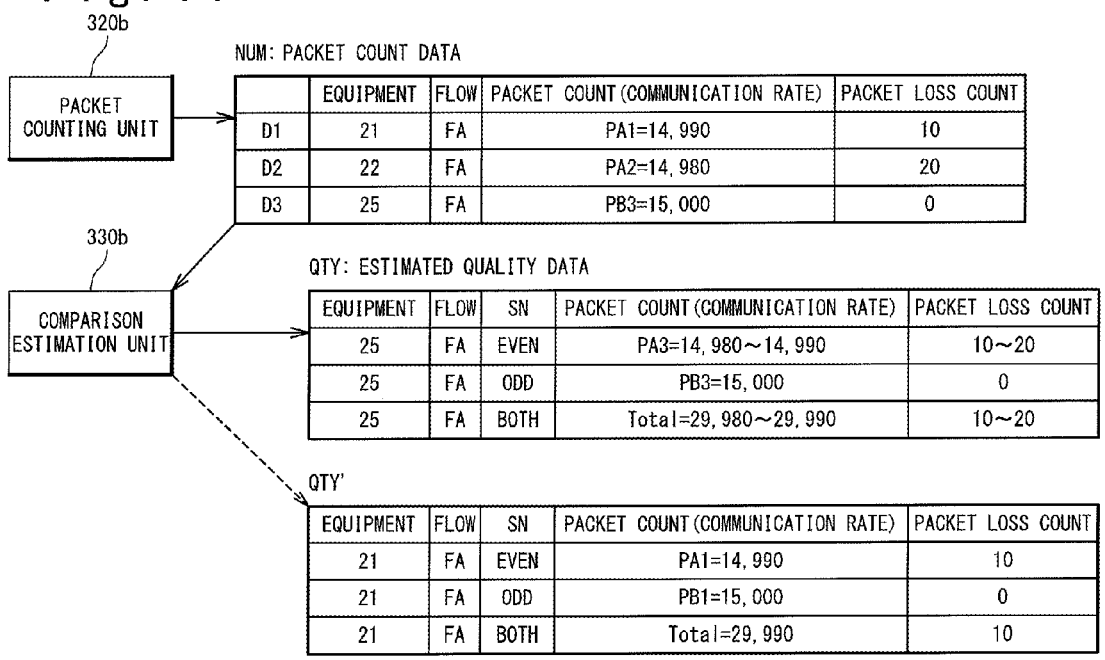
FIG. 11 is a diagram for explaining the second processing example.

As shown in FIG. 11, the packet counting unit 320b counts the number of the extracted packets with respect to each classification. In the present example, the classification is a combination of the equipment number and the flow number. Therefore, the packet counting unit 320b counts respective numbers of the extracted packets PA1, PA2 and PB3 with regard to the flow FA. At this time, the packet counting unit 320b can also count the "packet loss count" until each of the measuring equipments 21, 22 and 25, as described below.

The SN of the flow FA is the field that the terminal 11 increases by one every time it transmits a packet. Therefore, if the SN of the firstly extracted packet and the sampling rule are known, the SN of packets to be extracted thereafter can be predicted. For example, the sampling rule applied to the measuring equipment 21 is "SN=even number", and therefore the SN of the packet PA1 extracted by the measuring equipment 21 is predicted to be 2, 4, 6, 8, 10, . . . , 2n (n is an integer not less than 1), if no packet loss occurs. If a packet PA1 having the predicted SN is not extracted, it is possible to judge that packet loss has occurred.

Therefore, when performing the count processing (Step S320) with reference to the above-described extracted packet database DBP, the packet counting unit 320b refers to the sampling rule database DBSR as well (see FIG. 6). Thereby, the packet counting unit 320b can recognize the sampling rules applied to the respective measuring equipments and predict the SN of packets to be extracted in the respective measuring equipments. After the "packet count (communication rate)" and the "packet loss count" each is set to an initial value 0 with regard to each measuring equipment, the count processing is started. In the count processing, the packet counting unit 320b refers to the SN included in the packet data to determine whether or not a packet having the predicted SN exists in the extracted packet database DBP. If a packet having the predicted SN exists, the packet counting unit 320b counts up the "packet count". On the other hand, if a packet having the predicted SN does not exist, the packet counting unit 320b counts up the "packet loss count". In this manner, the packet counting unit 320b can count the "packet count (communication rate)" and the "packet loss count" in each of the measuring equipments 21, 22 and 25.

An example of the packet count data NUM indicating the counting result is shown in FIG. 11. The packet count data NUM includes entries D1 to D3, and each entry indicates correspondence relationship between the equipment number, the flow number, the packet count (communication rate) and the packet loss count. In the present example, the number of the packets PA1 extracted by the measuring equipment 21 is 14990, and the packet loss count is 10. The number of the packets PA2 extracted by the measuring equipment 22 is 14980, and the packet loss count is 20. The number of the packets PB3 extracted by the measuring equipment 25 is 15000, and the packet loss count is 0.

The comparison estimation unit 330b refers to the packet count data NUM to estimate the communication quality by the comparison estimation method. First, it can be seen from the packet count data NUM that the flow FA has passed through the measuring equipments 21, 22 and 25. Next, the comparison estimation unit 330b refers to the sampling rule database DBSR to check the sampling rules applied to the respective measuring equipments 21, 22 and 25. In the present example, the sampling rules applied to the two measuring equipments 21 and 22 are the same "SN=even number". It is therefore possible to apply the comparison estimation method with respect to the measuring equipment 25 placed between the measuring equipments 21 and 22. The comparison estimation unit 330b refers to the packet count data NUM again to obtain the number of the packets PA1 extracted by the measuring equipment 21 (=14990) and the number of the packets PA2 extracted by the measuring equipment 22 (=14980). By a comparison between the two numbers, the number of the packets PA3 (SN=even number) that have actually passed through the measuring equipment 25 is estimated to be "14980 to 14990". Moreover, the number of lost packets PA3 (SN=even number) at the measuring equipment 25 is estimated to be "10 to 20".

Meanwhile, the packets PB3 whose SN=odd number are actually measured in the measuring equipment 25. As indicated by the packet count data NUM, the number of the packets PB3 (SN=odd number) that have actually passed through the measuring equipment 25 is turned out to be 15000. Therefore, the comparison estimation unit 330b can estimate the communication quality (communication rate and packet loss count) in the measuring equipment 25 by combining the estimated number of the packets PA3 (SN=even number) and the number of the extracted packets PB3 (SN=odd number). The estimated quality data QTY shown in FIG. 11 indicates the estimation result. The communication rate of the flow FA in the measuring equipment 25 is estimated to be "29980 to 29990". Also, the packet loss count until the measuring equipment 25 is estimated to be "10 to 20".

In this manner, the number of the packets PA3 can be estimated based on the sampling results in the upstream and downstream, although the packets PA3 are not extracted directly in the measuring equipment 25. Then, the communication quality in the measuring equipment 25 can be estimated by complementarily combining the estimated number of the packets PA3 and the measured number of the packets PB3. The processing load is reduced, because it is not necessary to extract the packets PA3 in the measuring equipment 25.

Furthermore, the estimation accuracy is higher than that in the case of the statistical estimation method. As a comparative example, let us consider a case where the communication rate in the measuring equipment 25 is estimated by the statistical estimation method. In this case, the sampling rule in the measuring equipment 25 also is set to the same "SN=even number". Let us consider a case where the extraction count (sample count c) of the packets PA3 in the measuring equipment 25 is 15000 (maximum number) with which the error rate becomes minimum. Since occurrence probability of SN=even number is 50%, an expected value of the total packet count (communication rate) in the measuring equipment 25 is statistically estimated to be "30000". Here, since the sample count c is 15000, the error rate is calculated to be 1.6% (confidence interval=95%) in accordance with the above-mentioned equation (1). Therefore, the communication rate in the measuring equipment 25 is estimated to be "29520 to 300480". The estimated range "29520 to 300480" is obviously wider than the estimated range "29980 to 29990" in the case of the present exemplary embodiment. To put it the other way around, the comparison estimation method according to the present exemplary embodiment is more advantageous in the estimation accuracy than the statistical estimation method.

Moreover, as in the case of the foregoing processing example (1), the communication quality in the measuring equipment 21 can also be estimated by considering the implicit prerequisite of the protocol. With regard to a group of packets PB satisfying the sampling rule "SN=odd number", the packets PB3 are extracted in the measuring equipment 25. Referring to the SN of the extracted packets PB3, it is estimated that "packets whose SN=1 to 30000 have been transmitted from the transmitting equipment". Therefore, the number of packets satisfying "SN=odd number" out of the packets transmitted by the transmitting equipment is estimated to be 15000. The packet counting unit 320b adds this information to the packet count data.

Based on the number of packets transmitted from the transmitting equipment (=15000) and the number of the extracted packets PB3 (=15000), the comparison estimation unit 330b estimates the number of the packets PB1 (SN=odd number) in the measuring equipment 21 to be "15000". Moreover, the number of the packets PA1 (SN=even number) in the measuring equipment 21 is turned out to be "14990". Therefore, the comparison estimation unit 330b can estimate the communication quality (communication rate and packet loss count) in the measuring equipment 21 by combining the number of the extracted packets PA1 (SN=even number) and the estimated number of the packets PB1 (SN=odd number). The estimated quality data QTY' shown in FIG. 11 indicates the estimation result. The communication rate in the measuring equipment 21 is estimated to be "29990" and the packet loss count is estimated to be "10".

It should be noted that the target field of the sampling rule is the "RTP sequence number (SN)" in the above description, but it is not limited to that. The target field when the communication rate and the packet loss count are estimated by the comparison estimation method just needs to satisfy the foregoing condition (A) as well as the following condition (B).

"Condition (B): a field with which, when a certain one packet is extracted, packets to be extracted thereafter can be predicted".

This condition (B) is required for estimating the packet loss count.

2-5. Modification Examples

In the above description, the configuration in which the server 31 (communication quality estimation equipment 30) is provided separately from the plurality of measuring equipments is described. However, the configuration of the communication quality estimation system 1 is not limited to that. The functions of the communication quality estimation equipment 30 may be installed in at least one measuring equipment. In other words, the measuring equipment can play the role of the communication quality estimation equipment 30 as well. In this case, the at least one measuring equipment has the packet accumulation unit 310, the packet counting unit 320, the comparison estimation unit 330 and the like. Alternatively, each measuring equipment may have the packet accumulation unit 310, the packet counting unit 320, the comparison estimation unit 330 and the like. The same estimation processing can be achieved by exchanging data between the measuring equipments.

The communication quality estimation equipment 30 does not necessarily have the sampling rule database DBSR. For example, each measuring equipment may transmit contents of the set sampling rule data DSR along with the data of the extracted packet and the equipment number to the communication quality estimation equipment 30. In this case, the communication quality estimation equipment 30 can recognize the sampling rules set in the respective measuring equipments and hence does not require the sampling rule database DBSR.

In the above description, the configuration in which each measuring equipment exists on the packet forwarding path is described. However, the configuration is not limited to that. In a case where there exists a mirror port of a switch, a network TAP equipment or the like, the measuring equipment is allowed to not exist on the forwarding path directly. Also, such mechanism as a packet observation function of a router or a switch also can be used.

In the example described above, the quality estimation is performed with respect to each classification based on the flow or the SN. However, the classification is not limited to that. Classifications based on port and upper layer application also are possible. The upper layer application is exemplified by MPEG and SVC (Scalable Video Coding). The target of the sampling rule may be the sequence number, I-picture, B-picture, P-picture and the like of MPEG header. Moreover, classification based on basic layer and extended layer of the SVC also is possible. For example, in a case where the measuring equipments 21 and 22 obtain the basic layer and the measuring equipment 25 obtains the extended layer, quality of the basic layer in the measuring equipment 25 can be comparison-estimated based on results of measurement in the measuring equipments 21 and 22. Besides, classification based on M bit value of the RTP also is possible. For example, in a case where the measuring equipments 21 and 22 obtain packets whose M bit=1 and the measuring equipment 25 obtains packets whose M bit=0, quality of the packets whose M bit=1 in the measuring equipment 25 can be comparison-estimated based on results of measurements in the measuring equipments 21 and 22.

3. Second Exemplary Embodiment

A second exemplary embodiment of the present invention is a combination of the first exemplary embodiment and the "statistical estimation method". In the second exemplary embodiment, communication quality at a point which cannot covered by the direct measurement nor the comparison estimation method is covered by the statistical estimation method. In the description below, an overlapping explanation with the first exemplary embodiment will be omitted as appropriate.

3-1. Configuration

In the present exemplary embodiment, the configuration of each of the measuring equipments 21 to 25 is the same as in the first exemplary embodiment.

Figure 12:
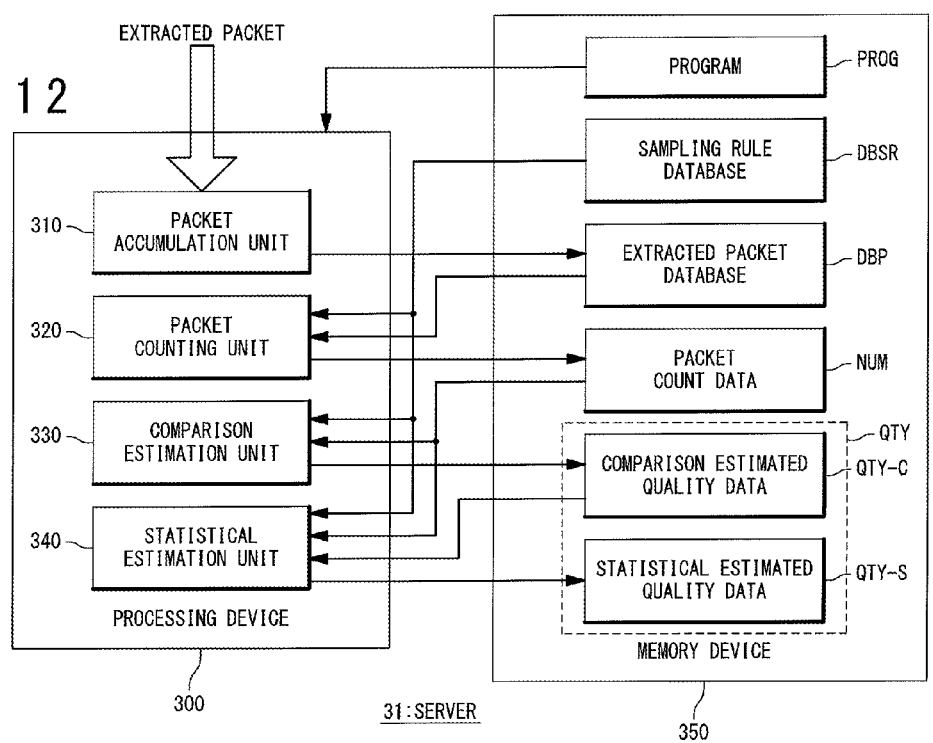
FIG. 12 is a block diagram showing a configuration of the communication quality estimation equipment according to a second exemplary embodiment of the present invention.

FIG. 12 is a block diagram showing a configuration example of the server 31 (communication quality estimation equipment 30) in the present exemplary embodiment. According to the present exemplary embodiment, the processing device 300 has a statistical estimation unit 340 in addition to the packet accumulation unit 310, the packet counting unit 320 and the comparison estimation unit 330. The statistical estimation unit 340 provides a function of the statistical estimation method. The functions other than the statistical estimation unit 340 are the same as in the case of the first exemplary embodiment.

Moreover, the estimated quality data QTY stored in the memory device 350 includes a comparison estimated quality data QTY-C and a statistical estimated quality data QTY-S. The comparison estimated quality data QTY is generated by the comparison estimation unit 330 in the same manner as in the first exemplary embodiment. The statistical estimated quality data QTY-S is generated by the statistical estimation unit 340.

3-2. Operation

Figure 13:
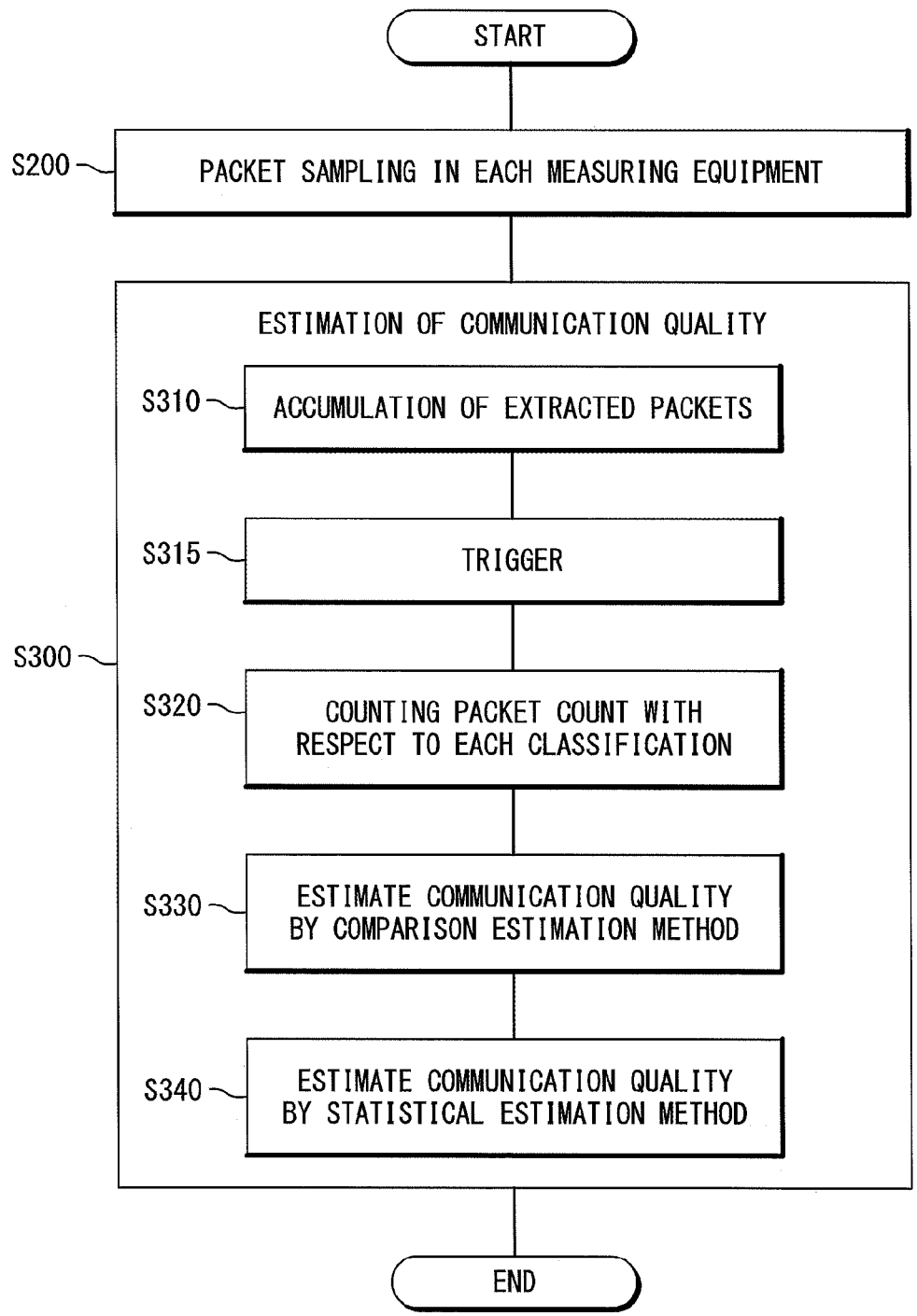
FIG. 13 is a flow chart showing the communication quality estimation method in the second exemplary embodiment.

FIG. 13 is a flow chart showing a communication quality estimation method in the present exemplary embodiment. Step S200 is the same as in the first exemplary embodiment. Step S300 includes Step S340 in addition to Steps S310, S315, S320 and S330. The processing other than Step S340 is the same as in the case of the first exemplary embodiment.

In Step S340, the statistical estimation unit 340 estimates the communication quality based on the statistical estimation method. At this time, the statistical estimation unit 340 statistically estimates the communication quality by using not only the quantities directly measured but also the quantities estimated by the comparison estimation method. To that end, the statistical estimation unit 340 reads not only the packet count data NUM (result of the direct measurement) but also the comparison estimated quality data QTY-C (result of the comparison estimation) from the memory device 350. Moreover, the statistical estimation unit 340 refers to the sampling rule database DBSR to calculate respective occurrence probabilities of the extracted packets and the comparison-estimated packets. Based on the calculated occurrence probabilities, the extracted packet count and the number of the comparison-estimated packet count, the statistical estimation unit 340 statistically estimates the communication quality (expected value). Data indicating the estimated communication quality is the statistical estimated quality data QTY-S.

As described above, according to the present exemplary embodiment, the statistical estimation method is carried out based on the quantities estimated by the comparison estimation method in addition to the quantities revealed by the direct measurement. Since the sample count c as the base is increased as compared with a case where only the statistical estimation method is employed, the estimation accuracy is improved (refer to the foregoing equation (1)).

3-3. Processing Example (3)

Figure 14:
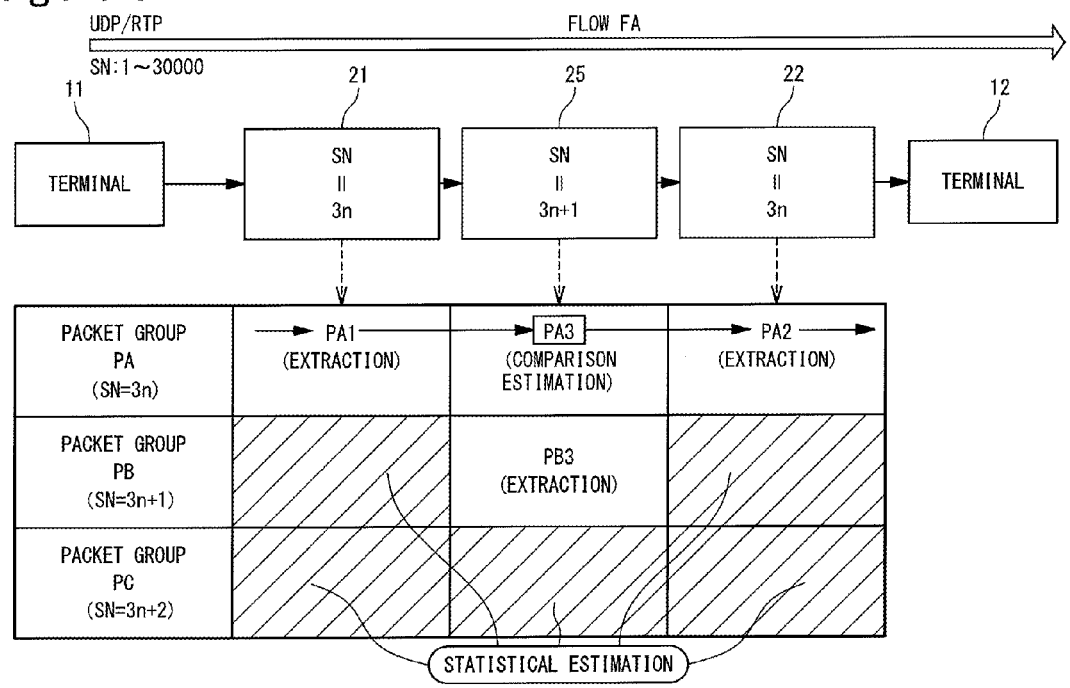
FIG. 14 is a diagram for explaining a third processing example.
Figure 15:
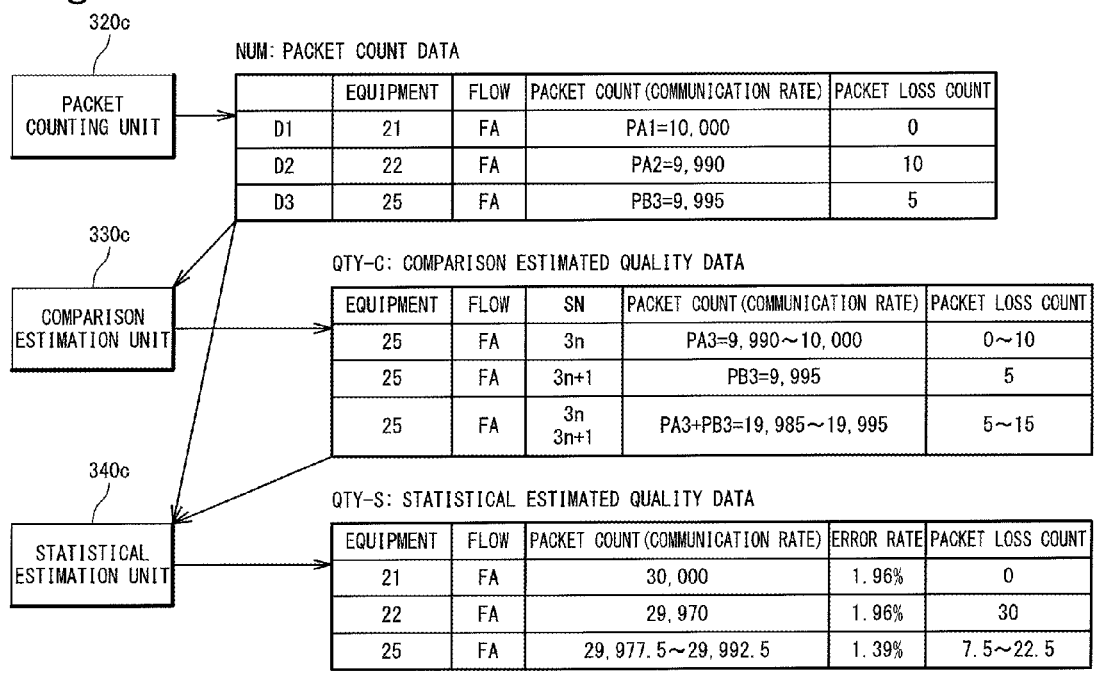
FIG. 15 is a diagram for explaining the third processing example.

Next, another concrete example of the processing will be described with reference to FIGS. 14 and 15. Let us consider processing of estimating the communication quality of the flow FA, as in the case of the foregoing processing example (2). A total number of packets of the flow FA is 30000 (SN: 1 to 30000). As shown in FIG. 14, the first sampling rule SRA applied to the measuring equipment 21 and the measuring equipment 22 is the same one, that is "SN=3n (n is an integer not less than 1)". On the other hand, the second sampling rule SRB applied to the measuring equipment 25 is different from the first sampling rule SRA, that is "SN=3n+1".

In this case, the measuring equipment 21 extracts packets PA1 (first packet) whose SN is divisible by 3 out of the packets of the flow FA. Also, the measuring equipment 22 extracts packets PA2 (second packet) whose SN is divisible by 3 out of the packets of the flow FA. Meanwhile, the measuring equipment 25 does not extract packets PA3 (fourth packet) whose SN is divisible by 3 out of the packets of the flow FA. Instead, the measuring equipment 25 extracts packets PB3 (third packet) whose SN leaves a remainder 1 when divided by 3, out of the packets of the same flow FA.

The packet counting unit 320c generates the packet count data NUM as in the case of the foregoing processing example (2). In the present example, as shown in FIG. 15, the number of the packets PA1 (SN=3n) extracted by the measuring equipment 21 is 10000, and the packet loss count is 0. The number of the packets PA2 (SN=3n) extracted by the measuring equipment 22 is 9990, and the packet loss count is 10. The number of the packets PB3 (SN=3n+1) extracted by the measuring equipment 25 is 9995, and the packet loss count is 5.

As in the case of the foregoing processing example (2), the comparison estimation unit 330c estimates the packet count (communication rate) and the packet loss count by the comparison estimation method. In the present example, the comparison estimation method can be applied with respect to the packets PA3 (SN=3n) passing through the measuring equipment 25. As indicated by the comparison estimated quality data QTY-C shown in FIG. 15, the number of the packets PA3 (SN=3n) is estimated to be "9990 to 10000". Also, the number of lost packets PA3 (SN=3n) at the measuring equipment 25 is estimated to be "0 to 10". Meanwhile, the number of the packets PB3 (SN=3n+1) is obtained by the direct extraction. Therefore, a total number of the packets PA3 (SN=3) and the packets PB3 (SN=3n+1) is estimated to be "19985 to 19995", and the packet loss count is estimated to be "5 to 15".

After that, the statistical estimation unit 340c further estimates, in accordance with the statistical estimation method, a packet count (communication rate) which are not yet extracted/estimated. At this time, the statistical estimation unit 340c refers to the packet count data NUM and the comparison estimated quality data QTY-C and uses a sum of the number of the actually extracted packets and the already-estimated number of packets as the "sample count c". Moreover, the statistical estimation unit 340c refers to the sampling rule database DBSR to calculate occurrence probability of the packets of the above-mentioned sample count c. In other words, the statistical estimation unit 340c calculates the occurrence probability of packets satisfying the sampling rule "SN=3n" or "SN=3n+1". Based upon the occurrence probability and the sample count c, the statistical estimation unit 340c statistically estimates the packet count (communication rate) and the packet loss rate in each measuring equipment. The estimation result is indicated by the statistical estimated quality data QTY-S shown in FIG. 15.

With regard to the flow FA passing through the measuring equipment 21, only the number of the packets PA1 (SN=3n) is already revealed. The occurrence probability of the packets PA1 (SN=3n) in the flow FA is ⅓. Since the number of the packets PA1 (SN=3n) namely the sample count c is 10000, the communication rate (expected value) of the flow FA passing through the measuring equipment 21 is statistically estimated to be "30000". Also, the packet loss count (expected value) until the measuring equipment 21 is statistically estimated to be "0". It should be noted that since the sample count c is 10000, the error rate is 1.96% (confidence interval=95%). Therefore, the communication rate of the flow FA in the measuring equipment 21 is estimated to be in a range of "29412 to 30588".

With regard to the flow FA passing through the measuring equipment 22, only the number of the packets PA2 (SN=3n) is already revealed. The occurrence probability of the packets PA2 (SN=3n) in the flow FA is ⅓. Since the number of the packets PA2 (SN=3n) namely the sample count c is 9990, the communication rate (expected value) of the flow FA passing through the measuring equipment 22 is statistically estimated to be "29970". Also, the packet loss count (expected value) until the measuring equipment 22 is statistically estimated to be "30". It should be noted that since the sample count c is 9990, the error rate is about 1.96% (confidence interval=95%). Therefore, the communication rate of the flow FA in the measuring equipment 22 is estimated to be in a range of "29382 to 30558".

With regard to the flow FA passing through the measuring equipment 25, the number of the packets PA3 (SN=3n) is already estimated and the number of the packets PB3 (SN=3n+1) is already revealed. In this case, a sum (=19985 to 19995) of the estimated number of the packets PA3 and the number of the extracted packets PB3 is used as the sample count c. Moreover, the occurrence probability of both of the packets PA3 (SN=3n) and the packets PB3 (SN=3n+1) in the flow FA is ⅔. Therefore, the communication rate (expected value) of the flow FA passing through the measuring equipment 25 is statistically estimated to be "29977.5 to 29992.5". Also, the packet loss count (expected value) until the measuring equipment 25 is statistically estimated to be "7.5 to 22.5". The error rate regarding the lower limit (=29977.5) of the communication rate is about 1.39% (confidence interval=95%), and a range of the lower limit is "29560.5 to 30394.5". On the other hand, the error rate regarding the upper limit (=29992.5) of the communication rate is about 1.39% (confidence interval=95%), and a range of the upper limit is "29575.5 to 30409.5". Therefore, the communication rate of the flow FA in the measuring equipment 25 is estimated to be in a range of "29560.5 to 30409.5".

As described above, the communication quality (communication rate, packet loss rate) in each measuring equipment can be estimated by combining the comparison estimation method and the statistical estimation method. At this time, the statistical estimation processing is performed based on the quantity estimated by the comparison estimation method in addition to the quantity revealed by the direct measurement. Since the sample count c as a base is increased as compared with a case where the statistical estimation method is merely applied, the error rate is decreased and the estimation accuracy is improved. For example, in the present example, the error rate of the estimation result with respect to the measuring equipments 21 and 22 is about 1.96%, while the error rate of the estimation result with respect to the measuring equipment 25 is about 1.39%. The reason is that the quantity estimated by the comparison estimation method also is taken into consideration in the statistical estimation processing with respect to the measuring equipment 25.

It should be noted that it is also possible to comparison-estimate the communication quality in the measuring equipment 21 by using the transmitting equipment (terminal 11) and the measuring equipment 25 in consideration of the implicit prerequisite of the protocol, as in the cases of the foregoing processing examples (1) and (2). In this case, the error rate of the estimation result with respect to the measuring equipment 21 also is reduced.

The target field of the sampling rule is the "RTP sequence number (SN)" in the above description, but it is not limited to that. The target field when the comparison estimation method and the statistical estimation method are combined just needs to satisfy the foregoing condition (A) as well as the following condition (C).

"Condition (C): probability distribution of each numerical value of the field is known."

In this case, the occurrence probability of packets satisfying the sampling rule can be calculated and thus the statistical estimation method can be applied. For example, in the case of the RTP sequence number (SN), the probability distribution of the SN is uniform and the occurrence probability of each SN is almost even. When estimation of the packet loss rate also is carried out, the foregoing condition (B) also is combined.

3-4. Processing Example (4)

Figure 16:
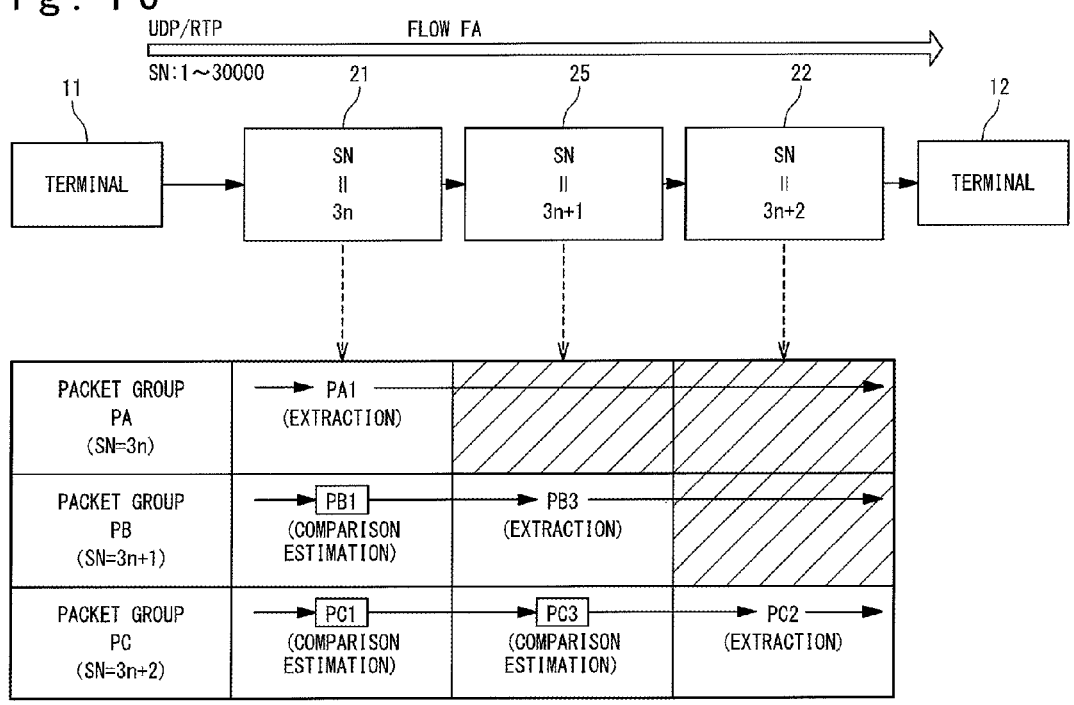
FIG. 16 is a diagram for explaining a fourth processing example.
Figure 17:
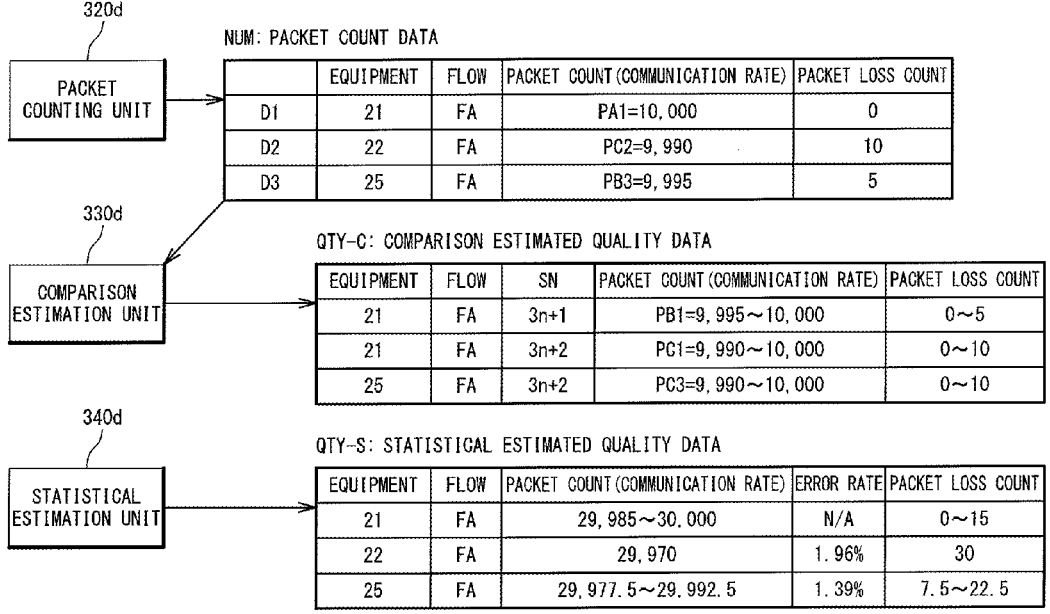
FIG. 17 is a diagram for explaining the fourth processing example.

Next, another concrete example of the processing will be described with reference to FIGS. 16 and 17. Let us consider processing of estimating the communication quality of the flow FA, as in the case of the foregoing processing example (3). A total number of packets of the flow FA is 30000 (SN: 1 to 30000).

In the present example, respective sampling rules applied to the measuring equipments 21, 22 and 25 are different from each other. More specifically, as shown in FIG. 16, a sampling rule "SN=3n" is applied to the measuring equipment 21. A sampling rule "SN=3n+2" is applied to the measuring equipment 22. A sampling rule "SN=3n+1" is applied to the measuring equipment 25. In this case, the measuring equipment 21 extracts packets PA1 (SN=3n) out of the packets of the flow FA. The measuring equipment 22 extracts packets PC2 (SN=3n+2) out of the packets of the flow FA. The measuring equipment 25 extracts packets PB3 (SN=3n+1) out of the packets of the flow FA.

The packet counting unit 320d generates the packet count data NUM as in the case of the foregoing processing example (3). In the present example, as shown in FIG. 17, the number of the packets PA1 (SN=3n) extracted by the measuring equipment 21 is 10000, and the packet loss count is 0. The number of the packets PC2 (SN=3n+2) extracted by the measuring equipment 22 is 9990, and the packet loss count is 10. The number of the packets PB3 (SN=3n+1) extracted by the measuring equipment 25 is 9995, and the packet loss count is 5.

In the present example, the comparison estimation unit 330d regards the transmitting equipment (terminal 11) as one measuring equipment in consideration of the implicit prerequisite of the protocol and performs the comparison estimation processing. A result of the comparison estimation processing is indicated by the comparison estimated quality data QTY-C shown in FIG. 17.

With regard to a group of packets PB satisfying the sampling rule "SN=3n+1", the packets PB3 are extracted in the measuring equipment 25. It is therefore possible to apply the comparison estimation method with respect to the measuring equipment 21 placed between the terminal 11 and the measuring equipment 25. Specifically, the number of packets PB1 (SN=3n+1) having passed through the measuring equipment 21 is estimated to be "9995 to 10000". The packet loss count is estimated to be "0 to 5".

With regard to a group of packets PC satisfying the sampling rule "SN=3n+2", the packets PC2 are extracted in the measuring equipment 22. It is therefore possible to apply the comparison estimation method with respect to both of the measuring equipments 21 and 25 placed between the terminal 11 and the measuring equipment 22. Specifically, the number of packets PC1 (SN=3n+2) having passed through the measuring equipment 21 is estimated to be "9990 to 10000". The packet loss count is estimated to be "0 to 10". Similarly, the number of packets PC3 (SN=3n+2) having passed through the measuring equipment 25 is estimated to be "9990 to 10000". The packet loss count is estimated to be "0 to 10".

After that, the statistical estimation unit 340d carries out the statistical estimation processing, as in the case of the foregoing processing example (3). A result of the statistical estimation processing is indicated by the statistical estimated quality data QTY-S shown in FIG. 17.

With regard to the measuring equipment 21, the number of the packets PA1 (SN=3n) is "10000", the number of the packets PB1 (SN=3n+1) is "9995 to 10000" and the number of the packets PC1 (SN=3n+2) is "9990 to 10000". Since all kinds of the packet count are already measured or comparison-estimated, the statistical estimation processing is not necessary. The communication rate of the flow FA passing through the measuring equipment 21 is estimated to be "29985 to 30000". Also, the packet loss count is estimated to be "0 to 15".

With regard to the measuring equipment 22, the number of the packets PC2 (SN=3n+2) is "9990" and the others are neither measured nor estimated. Therefore, the statistical estimation processing is carried out as in the case of the foregoing processing example (3). Specifically, the communication rate (expected value) of the flow FA passing through the measuring equipment 22 is estimated to be "29970" and the packet loss count (expected value) is estimated to be "30". The error rate of the communication rate is about 1.96% (confidence interval=95%). The error rate of the packet loss count is about 62%.

With regard to the measuring equipment 25, the number of the packets PB3 (SN=3n+1) is "9995", the number of the packets PC3 (SN=3n+2) is "9990 to 10000", and the others are neither measured nor estimated. Therefore, the statistical estimation processing is carried out as in the case of the foregoing processing example (3). Specifically, the communication rate (expected value) of the flow FA passing through the measuring equipment 25 is estimated to be "29977.5 to 29992.5" and the packet loss count (expected value) is estimated to be "7.5 to 22.5". The error rate of the communication rate is about 1.39%.

As described above, the processing as in the case of the foregoing processing example (3) is possible, even if the respective sampling rules applied to the measuring equipments 21, 22 and 25 are different from each other.

In the above-described processing example, when the sample count c has a range, the statistical estimation processing is performed with respect to both the upper limit and the lower limit of the range. However, the method of the statistical estimation processing is not limited to that. For example, when the sample count c has a range, the statistical estimation processing may be performed with respect to a representative value (e.g. median value) included in the range. Besides, the communication quality may be statistically estimated by using the Bayes' estimation method and the like. What is important is that the communication quality at a point which cannot covered by the direct measurement nor the comparison estimation method is covered by the statistical method.

4. Third Exemplary Embodiment

In the above-described exemplary embodiments, the amounts of packets extracted in respective measuring equipments are almost equal. However, the sampling rules in the respective measuring equipments may be set such that the amounts of packets extracted in the respective measuring equipments become non-uniform.

Figure 18:
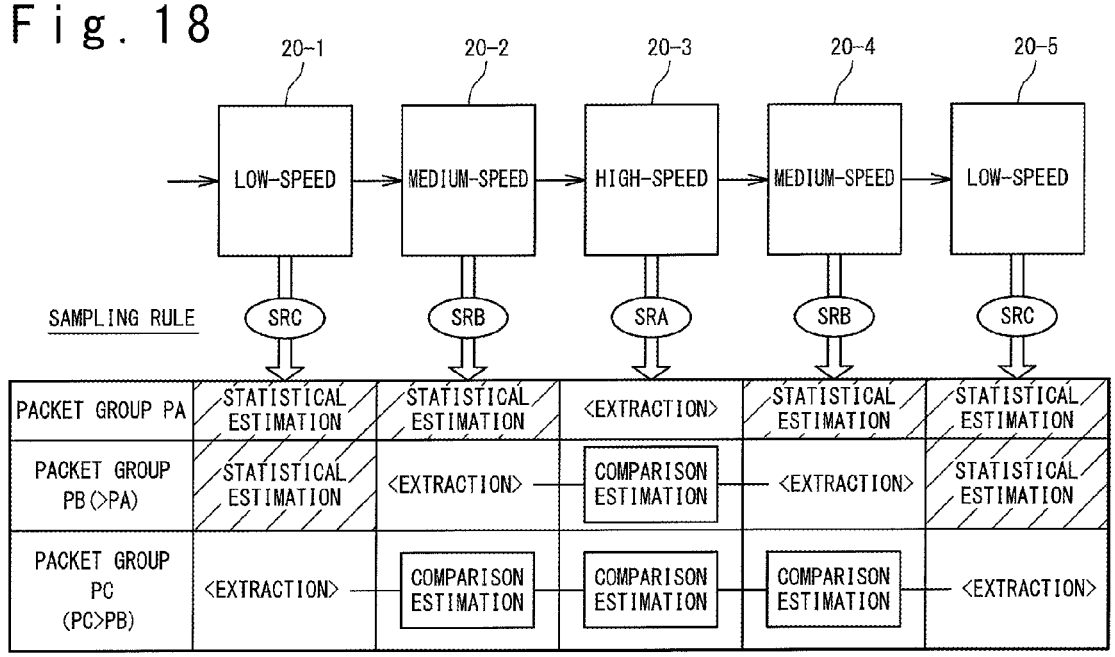
FIG. 18 is a conceptual diagram showing a third exemplary embodiment of the present invention.

For example, let us consider a case shown in FIG. 18 where five measuring equipments 20-1 to 20-5 performs communication of a flow. In general, transmission speed is higher near a central core network and becomes lower as closer to the edge of the network. In the example shown in FIG. 18, the measuring equipments 20-1 and 20-5 are located on a low-speed network, the measuring equipment 20-2 and 20-4 are located on a medium-speed network and the measuring equipment 20-3 is located on a high-speed network. In this case, it is preferable to set the sampling rules such that load on the measuring equipment on the higher-speed network is reduced as much as possible.

For example, in FIG. 18, a sampling rule SRA is applied to the measuring equipment 20-3. A group of packets PA in the flow satisfies the sampling rule SRA. A sampling rule SRB is applied to the measuring equipments 20-2 and 20-4. A group of packets PB in the flow satisfies the sampling rule SRB. A sampling rule SRC is applied to the measuring equipments 20-1 and 20-5. A group of packets PC in the flow satisfies the sampling rule SRC. Here, the sampling rules SRA, SRB and SRC are set such that "the number of elements of the group of packets PA<the number of elements of the group of packets PB<the number of elements of the group of packets PC". As a result, the load of the packet sampling processing in the measuring equipment on the higher-speed network is reduced, which is preferable.

Even in the case of the situation as shown in FIG. 18, the flow quality can be estimated with a high degree of accuracy, by employing the comparison estimation method. Moreover, the statistical estimation method may be employed complementarily.

5. Fourth Exemplary Embodiment

Figure 1:
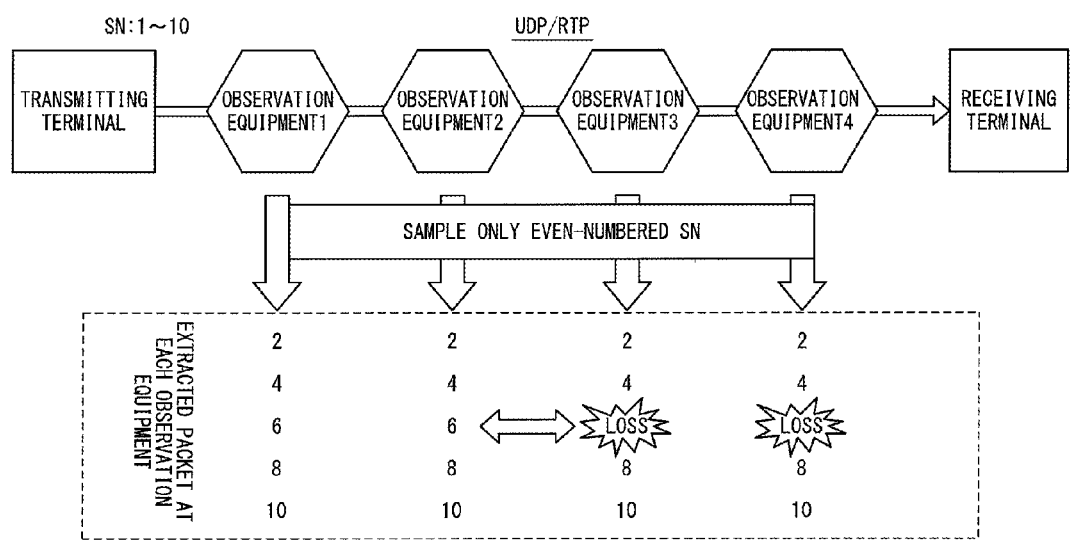
FIG. 1 is a conceptual diagram for explaining a "statistical estimation method" described in a related technique.

According to the "conventional statistical estimation method" shown in the foregoing FIG. 1, the same sampling rule is applied to the all measuring equipments. Therefore, the comparison estimation method cannot be employed. However, since the sampling rule is unified, a section where the packet loss occurs can be immediately identified, if a difference in the extracted packet count between the measuring equipments is detected. That is to say, a section where the communication quality is deteriorated can be identified, although the estimation accuracy of the communication quality in a certain point is low.

Therefore, it is considered that the more precise analysis of the communication quality becomes possible by dynamically switching "the above-described exemplary embodiment" and "the conventional statistical estimation method" depending on the situation. In other words, it is possible to perform suitable analysis depending on the situation, by dynamically switching the setting of the sampling rules. According to a fourth exemplary embodiment of the present invention, a technique that can dynamically change the setting of the sampling rules is provided. It should be noted that an overlapping description with the foregoing exemplary embodiments is omitted.

Figure 19:
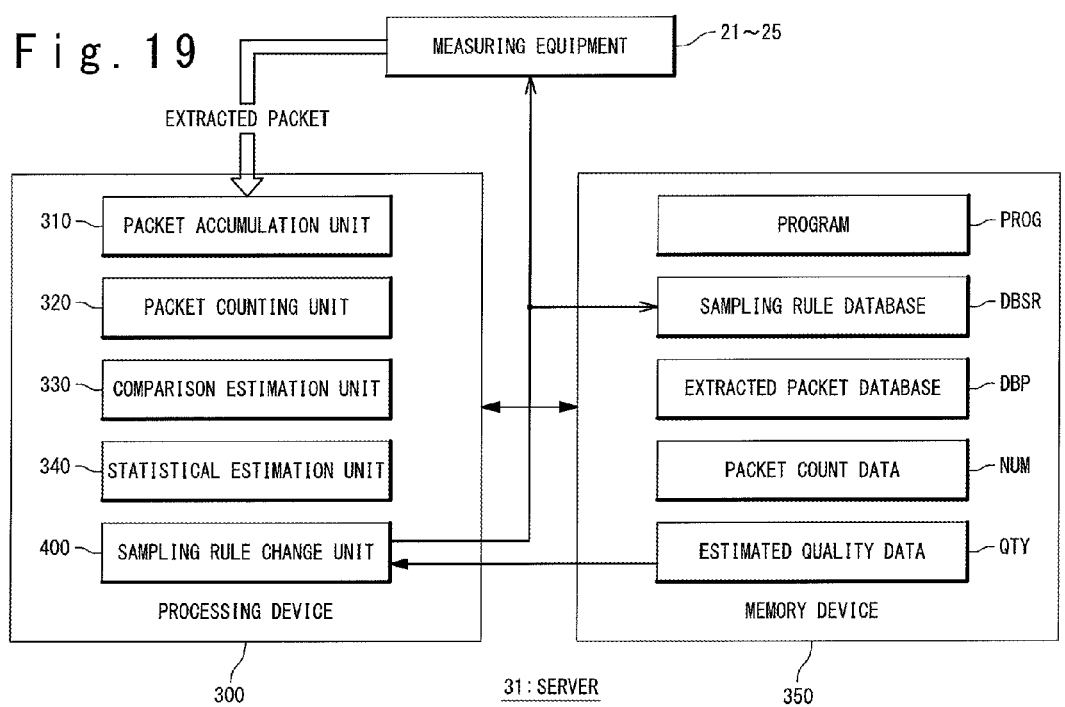
FIG. 19 is a block diagram showing a configuration of the communication quality estimation equipment according to a fourth exemplary embodiment of the present invention.

FIG. 19 is a block diagram showing a configuration example of the server 31 (communication quality estimation equipment 30) in the fourth exemplary embodiment. As compared with the foregoing exemplary embodiments, the processing device 300 according to the present exemplary embodiment further has a sampling rule change unit 400. The sampling rule change unit 400 refers to the estimated quality data QTY to dynamically change the setting of the sampling rules depending on the estimated communication quality (communication rate or packet loss rate).

Figure 20:
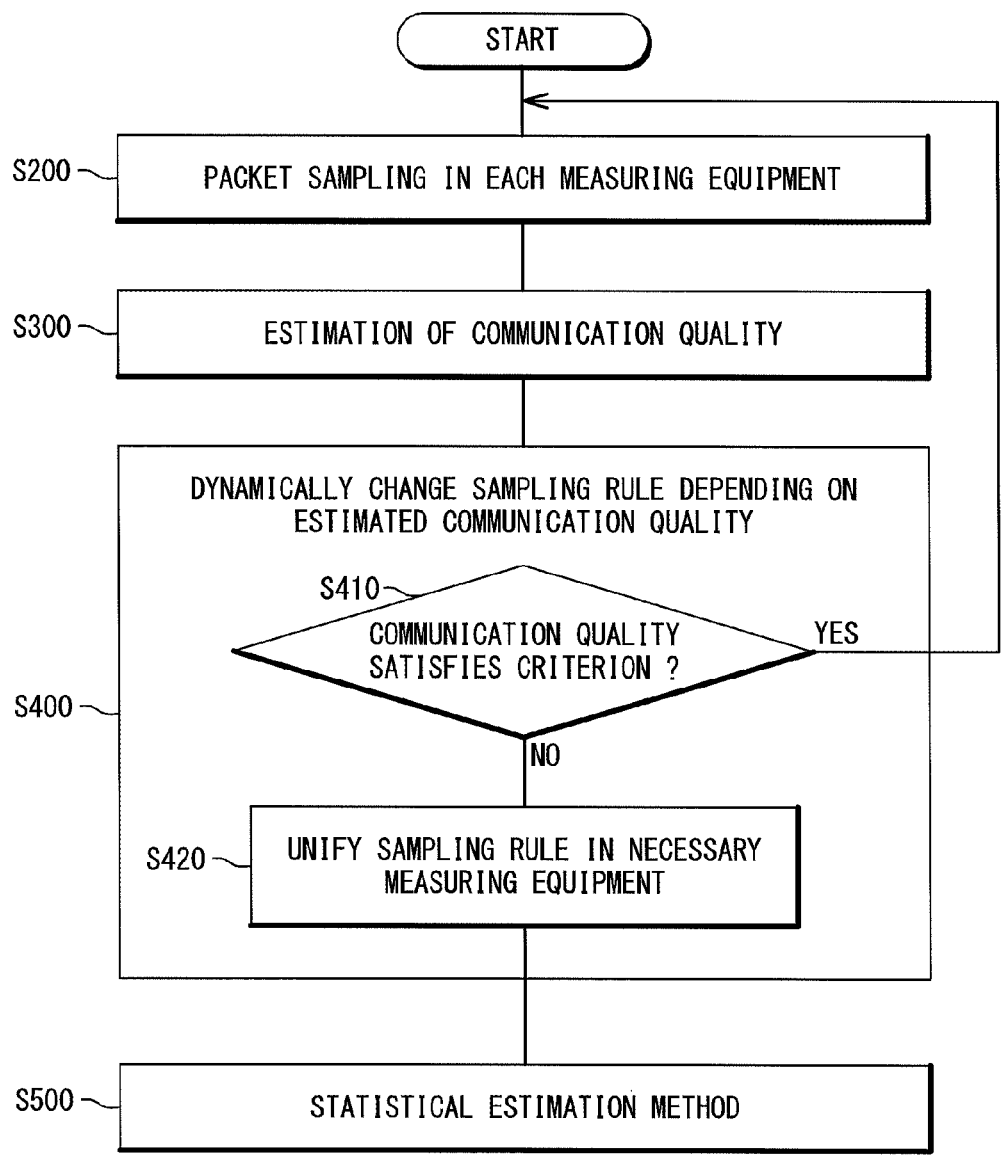
FIG. 20 is a flow chart showing the communication quality estimation method in the fourth exemplary embodiment.

FIG. 20 is a flow chart showing a communication quality estimation method in the present exemplary embodiment. Step S200 and Step S300 are the same as in the case of any of the foregoing exemplary embodiments.

(Step S400)

The sampling rule change unit 400 reads the estimated quality data QTY generated by the comparison estimation unit 330 and the statistical estimation unit 340 from the memory device 350. Then, the sampling rule change unit 400 refers to the estimated communication quality (communication rate or packet loss rate) and changes the setting of the sampling rules as necessary. More specifically, the sampling rule change unit 400 performs the following processing.

(Step S410)

The sampling rule change unit 400 refers to the estimated communication quality to determine whether change in the sampling rules is necessary or not. More specifically, in a case where the estimated communication quality does not satisfy a predetermined criterion, the sampling rule change unit 400 determines that change in the sampling rules is necessary. For example, it includes a case where the packet loss rate exceeds a threshold value (number or rate) and a case where the communication rate is decreased below a threshold value.

(Step S420)

When the communication quality does not satisfy the predetermined criterion, the sampling rule change unit 400 changes the setting of the sampling rules in order to identify the quality degradation section. More specifically, the sampling rule change unit 400 instructs necessary measuring equipments to change the sampling rule and also rewrites the changed point in the sampling rule database DBSR. The sampling rule is unified between the measuring equipments to which the change is instructed. At this time, it is not necessarily required to unify the sampling rules in all the measuring equipments. The sampling rules in only the measuring equipments necessary for identifying the quality degradation section may be set to the same.

(Step S500)

After the sampling rules are changed, the quality degradation section is identified in accordance with the "conventional statistical estimation method". In this case, the comparison estimation unit 330 does not operate but the statistical estimation unit 340 operates. The statistical estimation unit 340 statistically estimates the communication quality in each measuring equipment based on the packet sampling result in each measuring equipment. It is possible to identify the quality degradation section based on a difference in the communication quality between the measuring equipments.

As an example, let us consider a case shown in the foregoing FIG. 10. The sampling rule change unit 400 monitors the estimated communication quality (communication rate and packet loss rate). During a period when the communication quality satisfies the predetermined criterion (Step S410; Yes), the sampling rule change unit 400 does not change the sampling rules. Therefore, the high-accuracy comparison estimation method is maintained. In the meantime, the packet loss rate until the measuring equipment 22 exceeds a threshold value (Step S410; No). In this case, the sampling rule change unit 400 unifies the sampling rules in the respective measuring equipments (Step S420). For example, the sampling rule set in the measuring equipment 25 is switched from "SN=odd number" to "SN=even number". As a result, the sampling rules in the respective measuring equipments are unified, and thus the conventional statistical estimation method (Step S500) becomes possible.

Similarly, switching from the "conventional statistical estimation method" to the "comparison estimation method" is also possible.

While the exemplary embodiments of the present invention have been described above with reference to the attached drawings, the present invention is not limited to these exemplary embodiments and can be modified as appropriate by those skilled in the art without departing from the spirit and scope of the present invention.

This application is the National Phase of PCT/JP2008/070447, filed on Nov. 11, 2008, which is based upon and claims the benefit of priority from Japanese patent application No. 2007-304704, filed on Nov. 26, 2007, the disclosure of which is incorporated herein in its entirely by reference.

The invention claimed is:

1. A communication quality estimation system comprising:
   a plurality of equipments performing packet transmission on a network; and
   a communication quality estimation equipment,
   wherein said plurality of equipments comprises:
   a first equipment;
   a second equipment; and
   a third equipment placed downstream of said first equipment and upstream of said second equipment, and
   wherein said communication quality estimation equipment estimates communication quality in said third equipment by comparing a number of first packets satisfying a first sampling rule out of packets transmitted by said first equipment and a number of second packets satisfying said first sampling rule out of packets transmitted by said second equipment.

2. The communication quality estimation system according to claim 1,
   wherein said first equipment is a first measuring equipment that extracts said first packets satisfying said first sampling rule from transmission packets,
   said second equipment is a second measuring equipment that extracts said second packets satisfying said first sampling rule from transmission packets,
   said third equipment is a third measuring equipment that is placed downstream of said first measuring equipment and upstream of said second measuring equipment, and
   said communication quality estimation equipment estimates the communication quality in said third measuring equipment by comparing a number of said extracted first packets and a number of said extracted second packets.

3. The communication quality estimation system according to claim 2,
   wherein said third measuring equipment extracts third packets satisfying a second sampling rule different from said first sampling rule from transmission packets,
   said communication quality estimation equipment estimates a number of fourth packets satisfying said first sampling rule in said third measuring equipment by comparing the number of said extracted first packets and the number of said extracted second packets, and estimates the communication quality in said third measuring equipment by combining a number of said extracted third packets and said estimated number of fourth packets.

4. The communication quality estimation system according to claim 1,
   wherein estimation of communication quality in said first equipment is possible,
   said second equipment is a second measuring equipment that extracts said second packets satisfying said first sampling rule from transmission packets,
   said third equipment is a third measuring equipment that is placed downstream of said first equipment and upstream of said second measuring equipment,
   said communication quality estimation equipment estimates the communication quality in said third measuring equipment by comparing the number of said first packets satisfying said first sampling rule out of packets transmitted by said first equipment and a number of said extracted second packets.

5. The communication quality estimation system according to claim 4,
   wherein said third measuring equipment extracts third packets satisfying a second sampling rule different from said first sampling rule from transmission packets,
   said communication quality estimation equipment estimates a number of fourth packets satisfying said first sampling rule in said third measuring equipment by comparing the number of said first packets and the number of said extracted second packets, and estimates the communication quality in said third measuring equipment by combining a number of said extracted third packets and said estimated number of fourth packets.

6. The communication quality estimation system according to claim 1,
   wherein said communication quality estimation equipment further statistically estimates communication quality in each of said first equipment, said second equipment and said third equipment based on occurrence probability of packets satisfying said first sampling rule.

7. The communication quality estimation system according to claim 3,
   wherein said communication quality estimation equipment further statistically estimates the communication quality in said third equipment from the number of said extracted third packets and said estimated number of fourth packets based on occurrence probability of packets satisfying either said first sampling rule or said second sampling rule.

8. The communication quality estimation system according to claim 1,
   wherein said communication quality estimation equipment dynamically change setting of sampling rule depending on said estimated communication quality.

9. The communication quality estimation system according to claim 3,
   wherein when said estimated communication quality does not satisfy a predetermined criterion, said communication quality estimation equipment changes the sampling rule set for said third measuring equipment from said second sampling rule to said first sampling rule.

10. The communication quality estimation system according to claim 1,
    wherein said communication quality includes at least one of communication rate and packet loss rate.

11. A communication quality estimation equipment connected to a plurality of equipments performing packet transmission on a network,
    said plurality of equipments comprising:
    a first equipment;
    a second equipment; and
    a third equipment placed downstream of said first equipment and upstream of said second equipment,
    said communication quality estimation equipment comprising:

a memory device in which a packet count data indicating a number of first packets satisfying a first sampling rule out of packets transmitted by said first equipment and a number of second packets satisfying said first sampling rule out of packets transmitted by said second equipment is stored; and a comparison estimation unit configured to estimate communication quality in said third equipment by referring to said packet count data and comparing the number of said first packets and the number of said second packets.

12. The communication quality estimation equipment according to claim 11, wherein said first equipment is a first measuring equipment that extracts said first packets satisfying said first sampling rule from transmission packets, said second equipment is a second measuring equipment that extracts said second packets satisfying said first sampling rule from transmission packets, said third equipment is a third measuring equipment that is placed downstream of said first measuring equipment and upstream of said second measuring equipment, said packet count data indicates a number of said extracted first packets and a number of said extracted second packets, and said comparison estimation unit estimates the communication quality in said third measuring equipment by comparing the number of said extracted first packets and the number of said extracted second packets.

13. The communication quality estimation equipment according to claim 12, wherein said third measuring equipment extracts third packets satisfying a second sampling rule different from said first sampling rule from transmission packets, said packet count data further indicates a number of said extracted third packets, said comparison estimation unit estimates a number of fourth packets satisfying said first sampling rule in said third measuring equipment by comparing the number of said extracted first packets and the number of said extracted second packets, and estimates the communication quality in said third measuring equipment by combining a number of said extracted third packets and said estimated number of fourth packets.

14. A communication quality estimation method with regard to a plurality of equipments performing packet transmission on a network, said plurality of equipments comprising:

a first equipment;

a second equipment; and a third equipment placed downstream of said first equipment and upstream of said second equipment, said communication quality estimation method comprising:

obtaining a number of first packets satisfying a first sampling rule out of packets transmitted by said first equipment and a number of second packets satisfying said first sampling rule out of packets transmitted by said second equipment; and estimating communication quality in said third equipment by comparing the number of said first packets and the number of said second packets.

15. The communication quality estimation method according to claim 14, wherein said obtaining comprises:

extracting said first packets satisfying said first sampling rule from the packets transmitted by said first equipment; and extracting said second packets satisfying said first sampling rule from the packets transmitted by said second equipment, and wherein said estimating comprises:

estimating the communication quality in said third equipment by comparing the number of said extracted first packets and the number of said extracted second packets.

16. The communication quality estimation method according to claim 15, wherein said obtaining further comprises:

extracting third packets satisfying a second sampling rule different from said first sampling rule from packets transmitted by said third equipment, and wherein said estimating comprises:

estimating a number of fourth packets satisfying said first sampling rule in said third measuring equipment by comparing the number of said extracted first packets and the number of said extracted second packets; and estimating the communication quality in said third measuring equipment by combining a number of said extracted third packets and said estimated number of fourth packets.

* * * * *